(12) United States Patent
Munakata et al.

(10) Patent No.: US 12,469,727 B2
(45) Date of Patent: Nov. 11, 2025

(54) DEFECT DETECTION DEVICE AND DEFECT DETECTION METHOD

(71) Applicant: Yamaha Robotics Co., Ltd., Tokyo (JP)

(72) Inventors: Hiroshi Munakata, Tokyo (JP); Takuya Adachi, Tokyo (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 103 days.

(21) Appl. No.: 18/559,797

(22) PCT Filed: May 10, 2021

(86) PCT No.: PCT/JP2021/017711
§ 371 (c)(1),
(2) Date: Nov. 9, 2023

(87) PCT Pub. No.: WO2022/239067
PCT Pub. Date: Nov. 17, 2022

(65) Prior Publication Data
US 2024/0282608 A1 Aug. 22, 2024

(51) Int. Cl.
*H01L 21/67* (2006.01)
*G01N 21/95* (2006.01)
(Continued)

(52) U.S. Cl.
CPC ... *H01L 21/67288* (2013.01); *G01N 21/9501* (2013.01); *G01N 29/225* (2013.01); *G06T 7/0004* (2013.01); *G06T 2207/30148* (2013.01)

(58) Field of Classification Search
CPC .......... H01L 21/67288; G01N 21/9501; G01N 29/225; G06T 7/0004; G06T 2207/30148
See application file for complete search history.

(56) References Cited

U.S. PATENT DOCUMENTS 10,118,246 B2 11/2018 Hayata et al.
2022/0130026 A1* 4/2022 Kirkby .................. H04R 1/028

FOREIGN PATENT DOCUMENTS

JP S55128840 10/1980
JP H0964116 3/1997
(Continued)

OTHER PUBLICATIONS

"International Search Report (Form PCT/ISA/210) of PCT/JP2021/017711", mailed on Aug. 3, 2021, with English translation thereof, pp. 1-4.

(Continued)

*Primary Examiner* — Jamil Ahmed
(74) *Attorney, Agent, or Firm* — JCIPRNET

(57) ABSTRACT

A defect detection device (100) which detects a defect of a semiconductor device (10) includes: a standing wave generator (20), applying a standing wave (30) to the semiconductor device (10) to apply a suction force to a wire (13); cameras (41, 42); and a control part (50), adjusting an operation of a standing wave generator (20) and performing defect detection on the semiconductor device (10). The control part (50) captures, by using the cameras (41, 42), a first image of the semiconductor device (1) of a first state in which the suction force is applied to the wire (13) and a second image of the semiconductor device (10) of a second state in which the suction force applied to the wire (13) is smaller than the first stage, and compares the first image and the second image to perform defect detection.

17 Claims, 18 Drawing Sheets

(51) Int. Cl.
*G01N 29/22* (2006.01)
*G06T 7/00* (2017.01)

(56) References Cited

FOREIGN PATENT DOCUMENTS

| JP | 2002310892 | 10/2002 |
| JP | 2002359261 | 12/2002 |
| JP | 2016127085 | 7/2016 |
| JP | 2020027910 | 2/2020 |
| KR | 1020210021057 | 2/2021 |

OTHER PUBLICATIONS

"Office Action of Korea Counterpart Application", issued on Nov. 12, 2024, with English translation thereof, p. 1-p. 11.

* cited by examiner

DEFECT DETECTION DEVICE AND DEFECT DETECTION METHOD

CROSS-REFERENCE TO RELATED APPLICATION

This application is a 371 application of the International PCT application serial no. PCT/JP2021/017711, filed on May 10, 2021. The entirety of the above-mentioned patent application is hereby incorporated by reference herein and made a part of this specification.

TECHNICAL FIELD

The invention relates to a configuration of a defect detection device performing defect detection on an inspection target by using ultrasonic waves and a defect detection method for performing defect detection by using ultrasonic waves.

RELATED ART

In the manufacture of a semiconductor device, wire bonding for connecting an electrode of a substrate and an electrode of a semiconductor element by using a wire is performed. In wire bonding, a bonding defect may occur at the bonding part between the electrode of the substrate and the wire or the bonding part between the electrode of the semiconductor element and the wire. Since such connection defect is difficult to determine visually, a method in which a suitable current is input from the wire to the semiconductor chip, the value of the flowing current is measured, and an electrical connection defect is determined is used (for example, see Patent Document 1).

It addition, it may also be that the bonding part is monitored by using a scanning electron microscope (SEM), and the bonding state is determined (for example, see Patent Document 2).

CITATION LIST

Patent Literature

[Patent Document 1] Japanese Laid-open No. H09-64116
[Patent Document 2] Japanese Laid-open No. 2002-359261

SUMMARY OF INVENTION

Technical Problem

However, in wire bonding, a bonding defect that is difficult to detect through an image may occur, such as the case where the bonded wire is slightly raised from the surface of the electrode, the case where the wire contacts the electrode but is not bonded thereto, or the case where a ball neck and a looping wire are separated by a small crack.

Regarding such small bonding defect, for example, a method for checking bonding strength by pulling the wire after bonding is available. However, it may take a long time if a pulling test is carried out for all the bonding positions, and productivity may be significantly reduced.

Therefore, an objective of the invention is to detect a defect of an inspection target within a short time by using a simple configuration.

Solution to Problem

A defect detection device according to the invention detects a defect of an inspection target in which a bonding article is bonded to a bonded article. The defect detection device includes: a standing wave generator, generating a standing wave, and applying the standing wave that is generated to the inspection target to apply a suction force to the bonding article; an image capturing device, capturing an image of the inspection target; and a control part, adjusting an operation of the standing wave generator and performing defect detection on the inspection target. The control part captures, by using the image capturing device, a first image of the inspection target of a first state in which the suction force is applied to the bonding article and a second image of the inspection target of a second state in which the suction force applied to the bonding article is smaller than the first state. The first image of the first state and the second image of the second state are compared to perform defect detection on the inspection target.

In this way, when the standing wave is applied to the inspection target, the bonding article of the inspection target is sucked to a node of the sound of the standing wave and deformed. Therefore, by capturing the first image of the inspection target of the first state in which the suction force is applied to the bonding article and the second image of the inspection target of the second state in which the suction force applied to the bonding article is smaller than the first state and comparing the first image and the second image, defect detection can be performed. In addition, by applying the standing wave to multiple inspection targets at the same time to compare the first images and the second images of the multiple inspection targets, defect detection on multiple inspection targets can be performed within a short time.

In the defect detection device according to the invention, the standing wave generator may be at least one set of ultrasonic wave generators disposed to face each other.

Accordingly, the standing wave can be generated by using a simple method.

In the defect detection device according to the invention, the standing wave generator may be formed by an ultrasonic wave generator and a reflective surface disposed to face the ultrasonic wave generator.

Accordingly, the standing wave can be generated by using a simple method.

In the defect detection device according to the invention, the standing wave generator may be disposed so that a position of a node of a sound pressure of the standing wave is right above the inspection target.

In this way, by disposing the position of the node of the sound pressure of the standing wave right above the inspection target, the defect of the inspection target can be detected through deformation detection, as the inspection target where a defect is present is pulled upward toward the node of the sound pressure.

In the defect detection device according to the invention, the ultrasonic wave generator may be an ultrasonic wave phased array formed by a plurality of ultrasonic wave speakers or ultrasonic wave vibrators, and one or more of a frequency, an amplitude, and a phase of an ultrasonic wave generated by each of the ultrasonic wave speakers or each of the ultrasonic wave vibrators may be set, so that a focus region of the standing wave generated between the set of ultrasonic wave phased arrays is right above the inspection target.

In the defect detection device according to the invention, the ultrasonic wave generator may be an ultrasonic wave phased array formed by a plurality of ultrasonic wave speakers or ultrasonic wave vibrators, and one or more of a frequency, an amplitude, and a phase of an ultrasonic wave generated by each of the ultrasonic wave speakers or each of the ultrasonic wave vibrators may be set, so that a focus region of the standing wave generated between the ultrasonic wave phased array and the reflexive surface is right above the inspection target.

In this way, by setting each parameter so that the focus region of the standing wave where the sound is enhanced is right above the inspection target, the node of the sound pressure with a large suction force can be located right above the inspection target, and the deformation of the inspection target can be increased. Accordingly, the detection accuracy for the defect of the inspection target can be increased.

In the defect detection device according to the invention, the defect detection device may include a stage. The bonded article may be sucked and fixed to an upper surface of the stage. The ultrasonic wave phased array may generate ultrasonic waves traveling in a direction along the upper surface of the stage. One or more of a frequency, an amplitude, and a phase of the ultrasonic wave generated by each of the ultrasonic wave speakers or each of the ultrasonic wave vibrators may be set, so that the focus region of the standing wave is right above the bonding article of the inspection target.

In this way, the ultrasonic waves traveling in the direction along the upper surface of the stage are generated from the ultrasonic wave phased array to generate the standing wave, and by changing each parameter, the focus region can be moved in the upper-lower direction.

Therefore, it can be set that the focus region can be located right above the bonding article while the position of the ultrasonic wave phased array is fixed. Accordingly, the focus region of the standing wave where the sound is enhanced can be located right above the bonding article to suck the bonding article upward by using a large suction force, and the deformation of the bonding article where a defect is present can be increased. Accordingly, the detection accuracy for the bonding article where a defect is present can be increased.

In the defect detection device according to the invention, the defect detection device may include a stage. The bonded article may be sucked and fixed to an upper surface of the stage. The reflexive surface may be a surface of the bonded article sucked and fixed to the upper surface of the stage. The ultrasonic wave generator may be disposed above the stage, and may generate an ultrasonic wave with a frequency that a position of a node of a sound pressure of the standing wave generated between the ultrasonic wave generator and the surface of the bonded article is right above the bonding article.

In this way, by disposing the ultrasonic wave phased array above the stage, the configuration space of the defect inspection device can be reduced.

In the defect detection device according to the invention, the ultrasonic wave generator may be an ultrasonic wave phased array formed by a plurality of ultrasonic wave speakers or ultrasonic wave vibrators.

In the defect detection device according to the invention, the inspection target may be a semiconductor device formed by a substrate, a semiconductor element installed to the substrate, and a wire bonded to an electrode of the semiconductor element and an electrode of the substrate to connect each of the electrodes. The bonded article of the inspection target may be the substrate and the semiconductor element installed to the substrate, and the bonding article of the inspection target may be the wire.

A defect detection method according to the invention detects a defect of an inspection target in which a bonding article is bonded to a bonded article. The defect detection method includes: a process of preparing a defect detection device comprising: a standing wave generator, generating a standing wave and applying the standing wave that is generated to the inspection target to apply a suction force to the bonding article; and an image capturing device, capturing an image of the inspection target; a first image capturing process, capturing, by using the image capturing device, a first image of the inspection target of a first state in which the suction force is applied to the bonding article; a second image capturing process, capturing, by using the image capturing device, a second image of the inspection target of a second state in which the suction force applied to the bonding article is smaller than the first state; and a defect detection process, comparing the first image of the first state and the second image of the second state to perform defect detection on the inspection target.

In this way, a defect of an inspection target can be detected within a short time by using a simple configuration.

The defect detection method according to the invention may include a position adjustment process, adjusting a relative position of the standing wave generator to the inspection target, so that a position of a node of a sound pressure of the standing wave is right above the inspection target.

In the defect detection method according to the invention, the standing wave generator may be configured by disposing ultrasonic wave phased arrays facing each other, the ultrasonic wave phased arrays being formed by a plurality of ultrasonic wave speakers or ultrasonic wave vibrators, and the defect inspection method includes a focus region adjustment process, adjusting one or more of a frequency, an amplitude, and a phase of an ultrasonic wave generated by each of the ultrasonic wave speakers or each of the ultrasonic wave vibrators, so that a focus region of the standing wave generated between the ultrasonic wave phased arrays is right above the inspection target.

In the defect detection method according to the invention, the ultrasonic wave generator may be formed by an ultrasonic wave phased array formed by a plurality of ultrasonic wave speakers or ultrasonic wave vibrators and a reflexive surface disposed to face the ultrasonic wave phased array, and the defect inspection method may include a focus region adjustment process, adjusting one or more of a frequency, an amplitude, and a phase of an ultrasonic wave generated by each of the ultrasonic wave speakers or each of the ultrasonic wave vibrators, so that a focus region of the standing wave generated between the ultrasonic wave phased array and the reflexive surface is right above the inspection target.

Accordingly, the node of the sound pressure with a large suction force can be located right above the inspection target to reliably suck and deform the inspection target, and the detection accuracy for the defect can be increased.

In the defect detection method according to the invention, the defect inspection device may include a stage, and the bonded article is sucked and fixed to an upper surface of the stage, and the ultrasonic wave phased array may generate ultrasonic waves traveling in a direction along the upper surface of the stage. In the focus region adjustment process, and a phase of an ultrasonic wave generated by each of the ultrasonic wave speakers or each of the ultrasonic wave vibrators may be adjusted, so that the focus region of the standing wave is right above the bonding article.

In this way, the ultrasonic waves traveling in the direction along the upper surface of the stage are generated from the ultrasonic wave phased array to generate the standing wave, and by adjusting each parameter, the focus region can be moved in the upper-lower direction. Therefore, it can be adjusted that the focus region can be located right above the bonding article while the position of the ultrasonic wave phased array is fixed. Accordingly, the focus region of the standing wave where the sound is enhanced can be located right above the bonding article to suck the bonding article upward by using a large suction force, and the deformation of the bonding article where a defect is present can be increased. Accordingly, the detection accuracy for the bonding article where a defect is present can be increased.

In the defect detection method according to the invention, the defect inspection device may include a stage, and the bonded article is sucked and fixed to an upper surface of the stage, and the standing wave generator may be formed by a surface of the bonded article sucked and fixed to the upper surface of the stage, and an ultrasonic wave phased array formed by a plurality of ultrasonic wave speakers or ultrasonic wave vibrators and disposed above the stage so as to face the upper surface of the stage. The defect inspection method may include a focus region position adjustment process, adjusting one or more of a frequency, an amplitude, and a phase of an ultrasonic wave generated by each of the ultrasonic speakers or each of the ultrasonic vibrators, and adjusting a position of a focus region of the standing wave generated between the ultrasonic phased array and the surface of the bonded article in a direction along the upper surface of the stage.

In this way, by adjusting the position of the focus region of the standing wave where the sound is enhanced in a direction along the upper surface of the stage, even if the inspection target is large, the defect inspection on the inspection target can be performed without moving the inspection target or the ultrasonic wave phased array.

In the defect detection method according to the invention, the inspection target may be a semiconductor device formed by a substrate, a semiconductor element installed to the substrate, and a wire bonded to an electrode of the semiconductor element and an electrode of the substrate to connect each of the electrodes. The bonded article of the inspection target may be the substrate and the semiconductor element installed to the substrate, and the bonding article of the inspection target may be the wire.

Effects of Invention

According to the invention, a defect of an inspection target can be detected within a short time by using a simple configuration.

DESCRIPTION OF EMBODIMENTS

Figure 1:
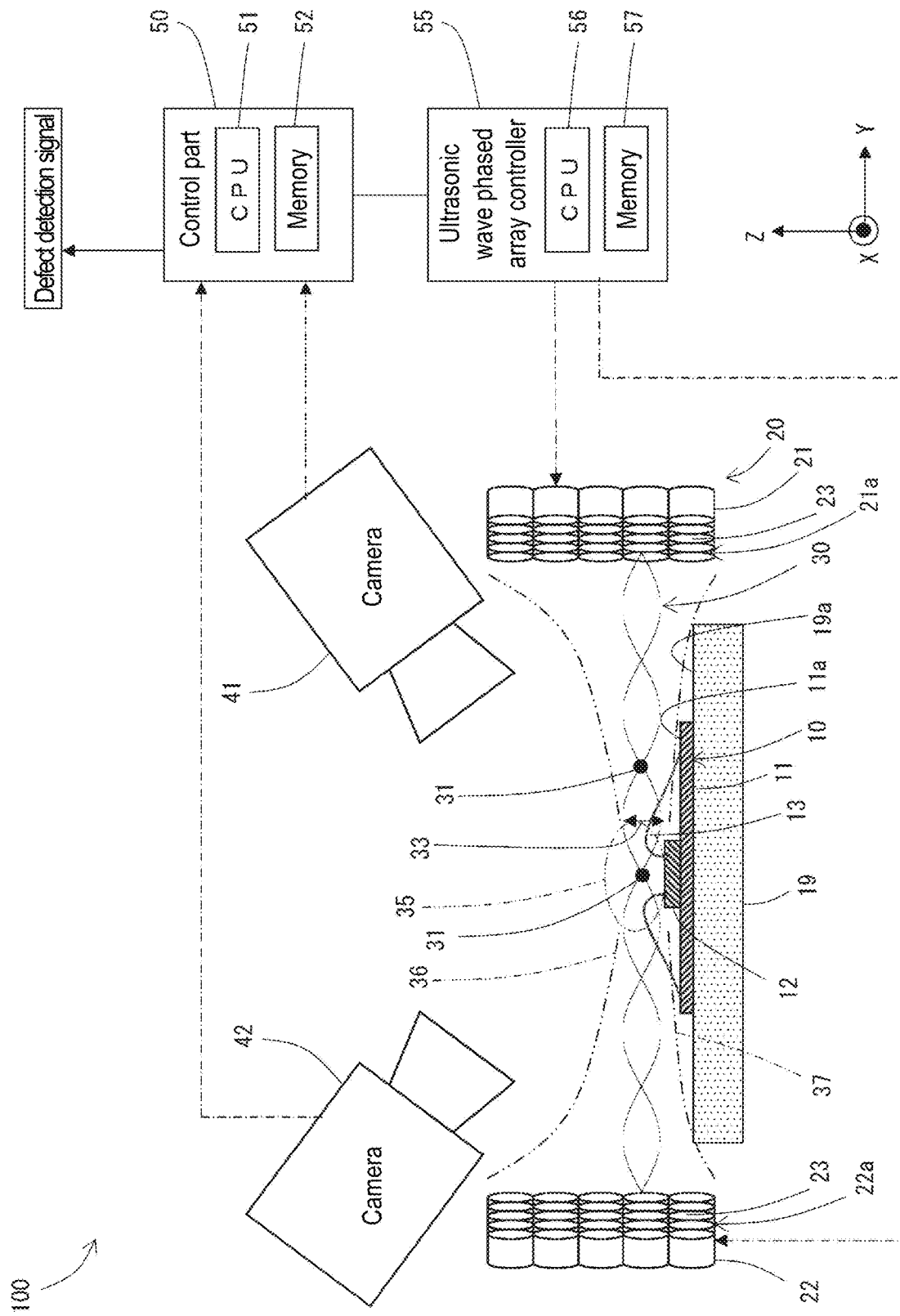
FIG. 1 is a system diagram illustrating a configuration of a defect detection device according to an embodiment.

In the following, a defect detection device 100 according to an embodiment is described with reference to the drawings. As shown in FIG. 1, the defect detection device 100 is formed by a stage 19, ultrasonic wave phased arrays 21, 22, cameras 41, 42, a control part 50, and an ultrasonic wave phased array controller 55. In the following description, the defect detection device 100 performs defect detection on a semiconductor device 10. However, it is possible to perform defect detection on another product. Also, in the following, the description is made by setting the right side of FIG. 1 as Y direction, a direction orthogonal to Y direction on a horizontal surface as X direction, and an upper-lower direction as Z direction. In addition, the description is made by setting the direction on the negative side of Y direction as the left side, the positive side of Y direction opposite thereto as the right side, the positive side of X direction as the front side, the negative side of X direction as the rear side, the positive side of Z direction as the upper side, and the negative side of Z direction as the lower side.

Figure 2:
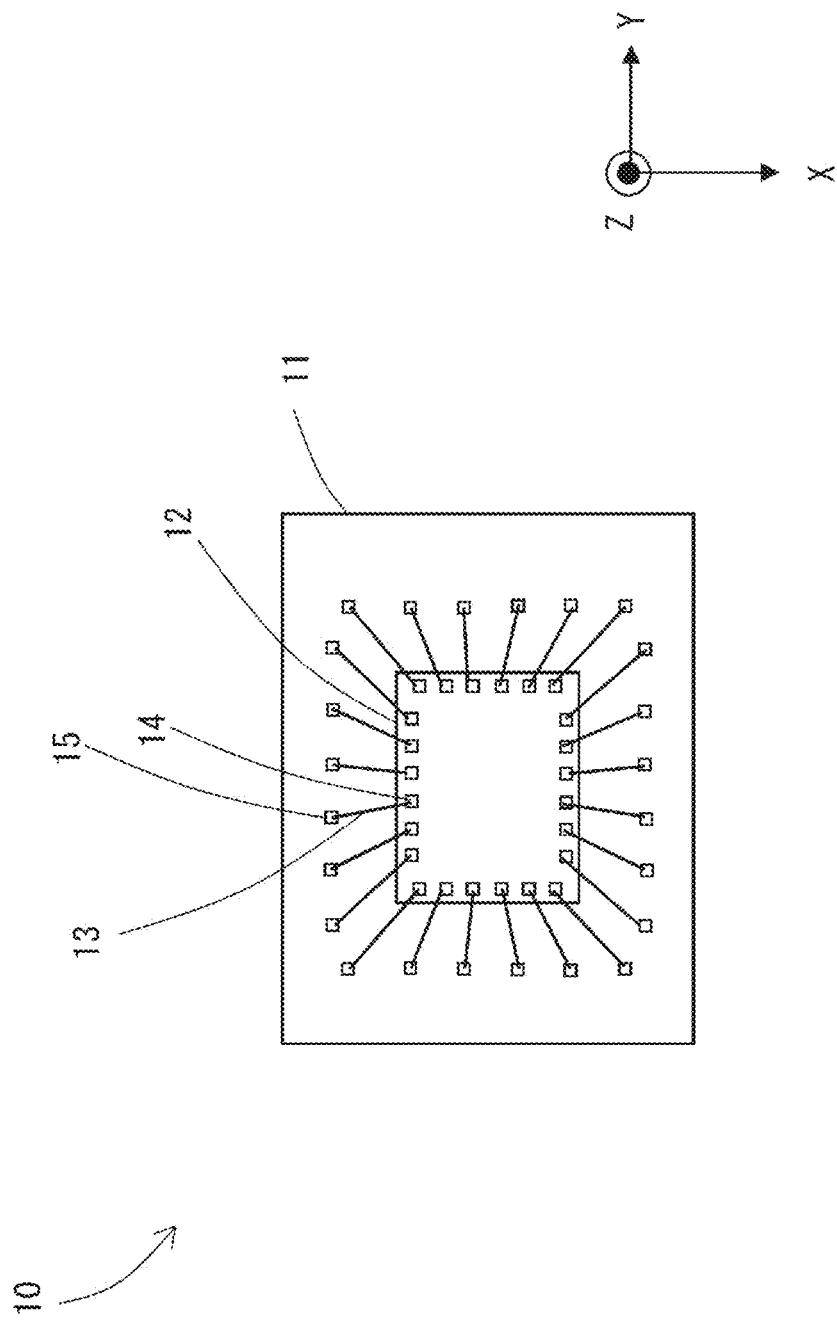
FIG. 2 is a planar view illustrating a semiconductor device as an inspection target.

In the stage 19, a semiconductor device 10, which is the inspection target, is sucked and fixed to an upper surface 19a. The upper surface 19a is a horizontal surface. In FIG. 2, an example of the semiconductor device 10 is shown. In the semiconductor device 10 shown in FIG. 2, a semiconductor element 12 is installed onto the top of a substrate 11, and an electrode 14 of the semiconductor element 12 and an electrode 15 of the substrate 11 are connected by a wire 13 such as a gold wire. Here, the substrate 11 and the semiconductor element 11 installed to the substrate 11 are bonded articles bonded by the wire 13, and the wire 13 is a bonding article bonded to the electrode 15 of the substrate 11 and the electrode 14 of the semiconductor element 12.

As shown in FIG. 1, the cameras 41, 42 as image capturing devices are disposed at the top on the positive side of Z direction on the two sides of the stage 19. The respective cameras 41, 42 respectively capture two-dimensional images of the semiconductor device 10 from the upper side of the semiconductor device 10, and output the data of the captured two-dimensional images to the control part 50.

The control part 50 is a computer including therein a CPU 51 performing information processing, and a memory storing image data input from the cameras 41, 42. The control part 50 processes the data of the two-dimensional images of the semiconductor device 10 input from the cameras 41, 42 to detect the defect of the semiconductor device 10. When detecting a defect, the control part 50 outputs a defect detection signal to the outside.

The ultrasonic wave phased arrays 21, 22 as ultrasonic wave generators are disposed on two sides of the stage 19. The ultrasonic wave phased arrays 21, 22 are devices in which multiple, such as tens or hundreds of ultrasonic wave vibrators 23 are arranged in a plane-like arrangement. When controlling a driving phase so that the phases from all the ultrasonic wave vibrators 23 are equal at one point in a space, the ultrasonic wave phased arrays 21, 22 can form ultrasonic beams focusing on such point, as indicated by two-dot chain lines 36, 37 shown in FIG. 1. In a focus region 35 focused by the ultrasonic beams, by adding up the amplitudes of the ultrasonic waves from the respective vibrators, ultrasonic waves with a large amplitude are obtained.

The ultrasonic wave phased array 21 on the right side of the stage 19 is disposed so that an ultrasonic wave generation surface 21a on which the ultrasonic wave vibrators 23 are disposed is vertical and directed toward the negative side of Y direction, and generates ultrasonic waves traveling toward the negative side of Y direction along the upper surface 19a of the stage 19. Meanwhile, the ultrasonic wave phased array 22 on the left side of the stage 19 is disposed so that an ultrasonic wave generation surface 22a on which the ultrasonic wave vibrators 23 are disposed is vertical and directed toward the positive side of Y direction, and generates ultrasonic waves traveling toward the positive side of Y direction along the upper surface 19a of the stage 19. In this way, the set of ultrasonic wave phased arrays 21, 22 disposed so that the ultrasonic wave generation surfaces 21a, 22a face each other respectively generate ultrasonic waves whose traveling directions are different from the respective ultrasonic wave phased arrays 21, 22, and synthesize the ultrasonic waves, thereby generating a standing wave 30 between the two ultrasonic wave phased arrays 21, 22. Accordingly, the set of ultrasonic wave phased arrays 21, 22 form a standing wave generator 20 synthesizing the ultrasonic waves whose traveling directions are different to generate the standing wave 30.

The standing wave 30 is an ultrasonic wave in which the position of maximum vibration and the position of minimum vibration do not move spatially between the two ultrasonic wave phased arrays 21, 22. The point where the vibration is the largest is referred to as an antinode 33 of a sound pressure, and the point where the vibration is the smallest is referred to as a node 31 of the sound pressure. A distance between adjacent nodes 31 is ½ of a wavelength λ of the ultrasonic waves generated by the ultrasonic wave phased arrays 21, 22. In the defect detection device 100 of the embodiment, the two ultrasonic wave phased arrays 21, 22 are installed at a height so that, as shown in FIG. 1, the focus region 35, the node 31 of the sound pressure are right above the semiconductor device 10.

The ultrasonic wave phased arrays 21, 22 are connected to the ultrasonic wave phased array controller 55. The ultrasonic wave phased array controller 55 includes therein a CPU 56 performing information processing and a memory 57 storing data such as a control program. Based on a command from the control part 55, the ultrasonic wave phased array controller 55 adjusts the vibration speed, the amplitude, and the phase of each of the ultrasonic wave vibrators 23 of each of the ultrasonic wave phased arrays 21, 22.

Figure 3:
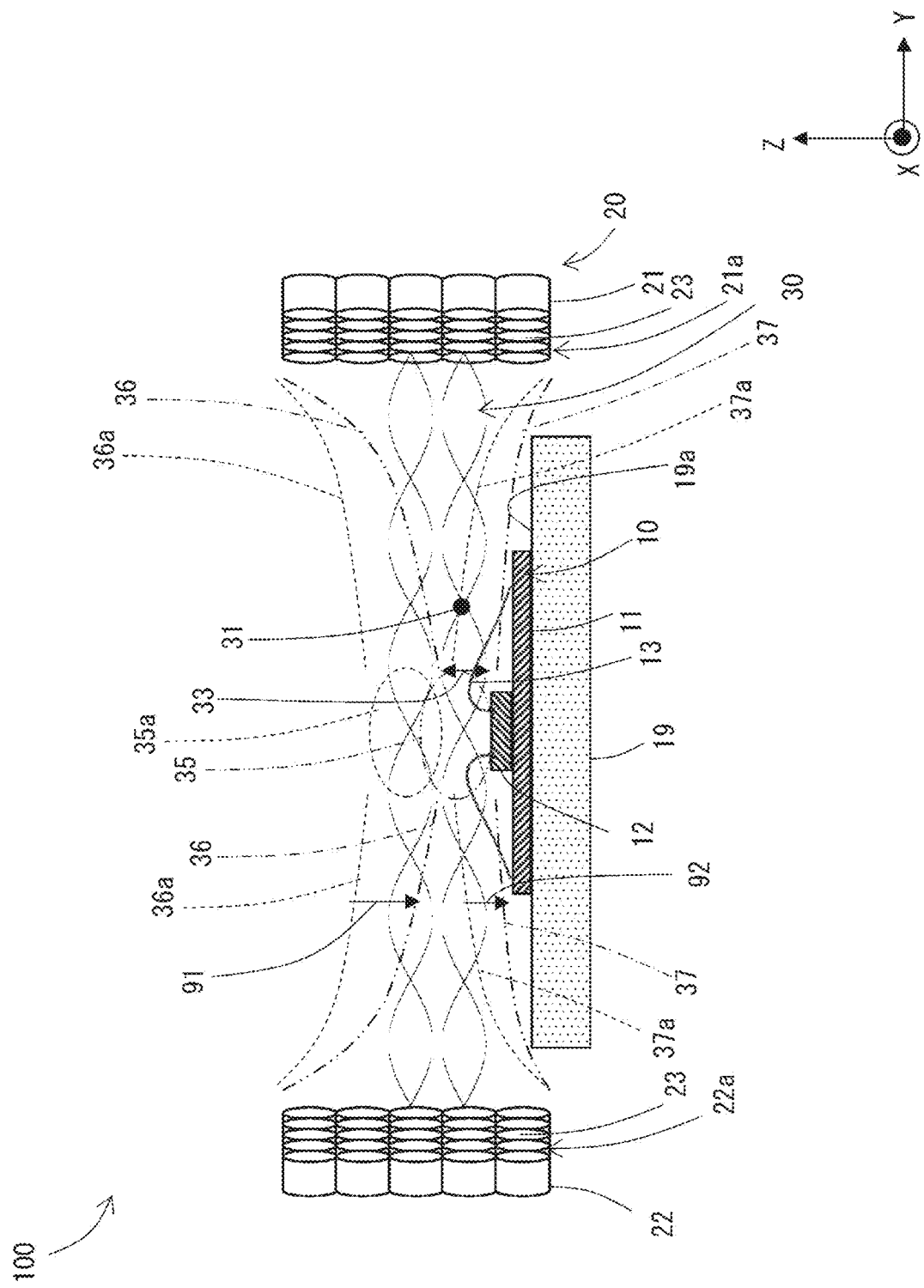
FIG. 3 is a side view illustrating an upper-lower movement of a focus region of a standing wave generated by an ultrasonic wave phased array of the defect detection device shown in FIG. 1.

When the frequency of the ultrasonic wave generated by each of the ultrasonic wave vibrators 23 is adjusted, the interval of the node 31 of the sound pressure of the standing wave 30 can be adjusted. In addition, by adjusting the amplitude and the phase of the ultrasonic wave generated by each of the ultrasonic wave vibrators 23, the position and the size of the focus region 35 as shown in FIG. 3 can be adjusted. For example, by adjusting the amplitude and the phase of the ultrasonic wave generated by each of the ultrasonic wave vibrators 23, the shape of the ultrasonic beam is changed from the shape indicated by broken lines 36a, 37a to the shape indicated by the two-dot chain lines 36, 37 as indicated by arrows 91, 92, and the position of the focus region 35 in Z direction can be moved from a focus region 35a in the vicinity of the center of the ultrasonic wave phased arrays 21, 22 in Z direction to the position right above the semiconductor device 10 like the focus region 35 indicated by the two-dot chain line.

In the defect detection device 100 of the embodiment, before defect detection starts, it may also be that the amplitude and the phase of the ultrasonic wave generated by each of the ultrasonic wave vibrators 23 are changed in accordance with the size of the inspection target by using the ultrasonic wave phased array controller 55, so as to adjust the amplitude and the phase so that the focus region 35, the node 31 of the sound pressure of the standing wave 30 is right above the semiconductor device 10 that is the inspection target, as indicated by the two-dot chain lines shown in FIGS. 1 and 3. In addition, at the same time, the frequency of the ultrasonic wave generated by the ultrasonic wave vibrator 23 is adjusted in accordance with the detection target to set to a frequency suitable for the detection target. The frequency, for example, may be freely set between 50 kHz to 1 MHz.

Figure 4:
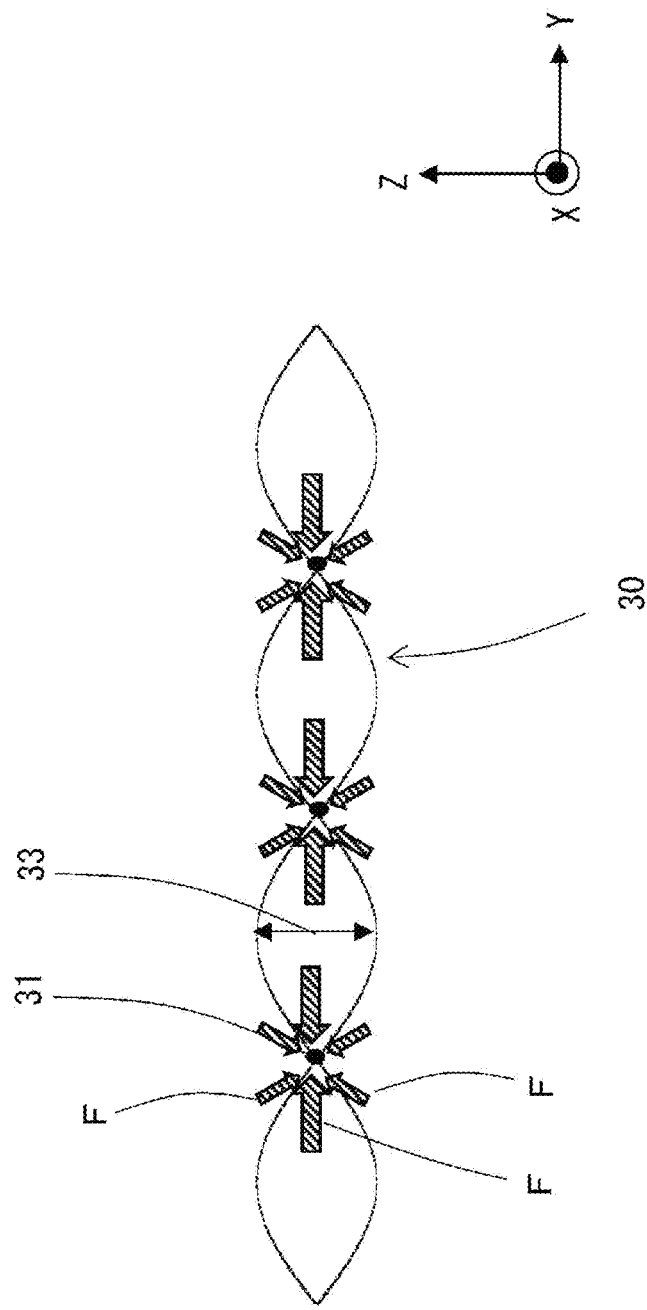
FIG. 4 is a view schematically illustrating a suction force generated at a node of a sound pressure of the standing wave.

Then, the suction force of the node 31 of the sound pressure of the standing wave 30 is described with reference to FIG. 4. As shown in FIG. 4, in the case where density is sufficiently greater than air and the compression rate is sufficiently smaller than air, a particle of a volume (m³) in the standing wave 30 receives a force F (N) as described above from the sound field of the standing wave 30.

$$F = -V \times \nabla U \qquad \text{(Formula 1)}$$

$$U = -(3/2) <Ka> + <Pa> \qquad \text{(Formula 2)}$$

Here, U(J/m³) represents a potential distribution, and the particle receives the force F toward where the potential is low. Ka(J/m$^3$) represents the kinetic energy density of the sound field, and Pa(J/m$^3$) represents the potential energy density of the sound field. In addition. < . . . > represents time average.

In the standing wave 30, at the position of the node 31 of the sound pressure (that is, the antinode of particle velocity), the potential is the minimum. Therefore, as shown in FIG. 4, the force F toward the node 31 of the sound pressure is applied to the particle, and the particle is sucked to the node 31 of the sound pressure. The force F is a sum of the force toward the node 31 in Y direction and the force toward the node 31 in X direction and Z direction. Therefore, the node 31 of the standing wave 30 sucks the particle toward the node 31 in Y direction, and sucks the particle toward the node 31 in X direction and Z direction.

Figure 5:
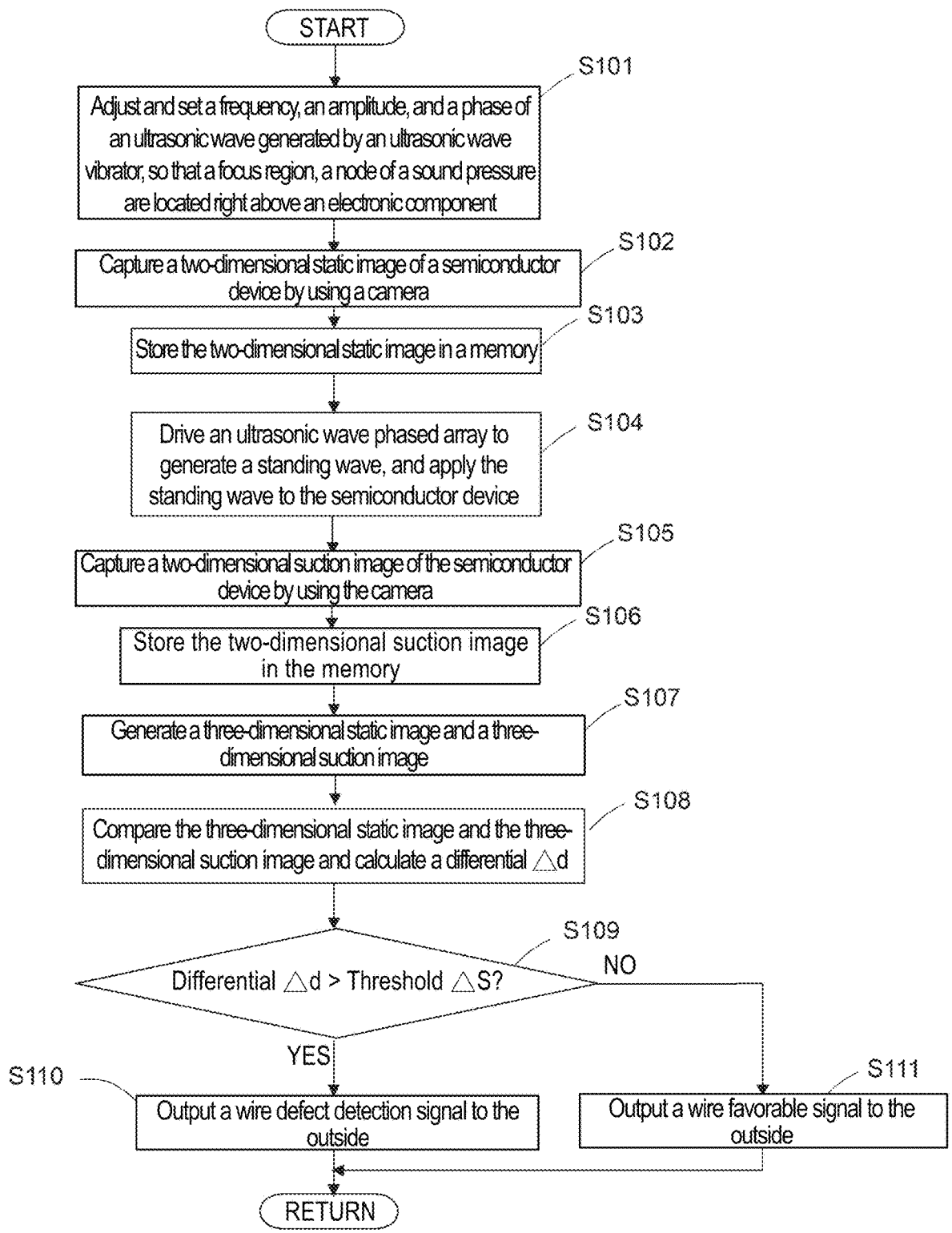
FIG. 5 is a flowchart illustrating a process for performing wire bonding defect detection by using the defect detection device shown in FIG. 1.
Figure 6:
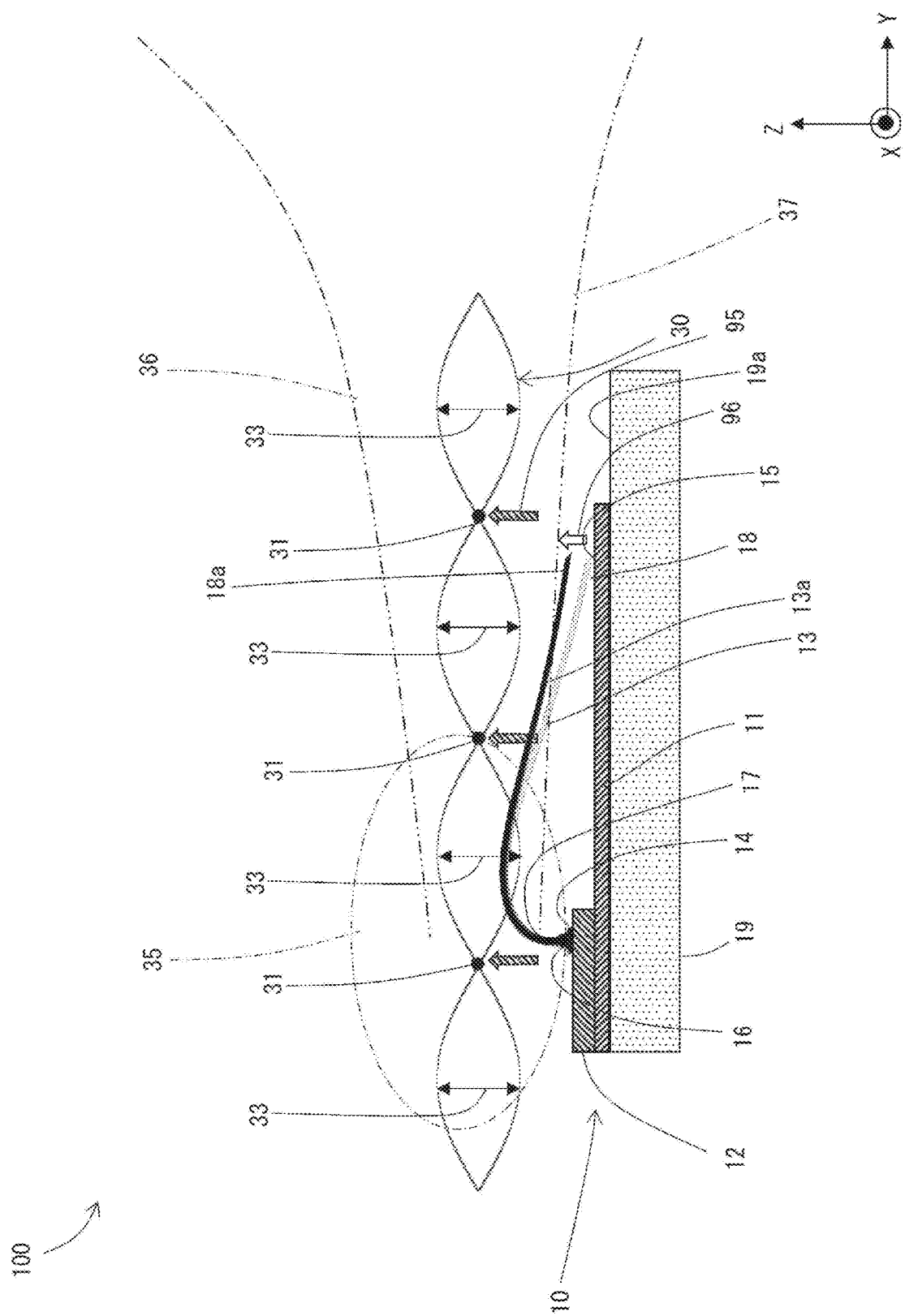
FIG. 6 is a side view illustrating a state in which a stitch bond part of a wire is sucked upward when the standing wave is applied to the semiconductor device by using the defect detection device shown in FIG. 1.
Figure 7:
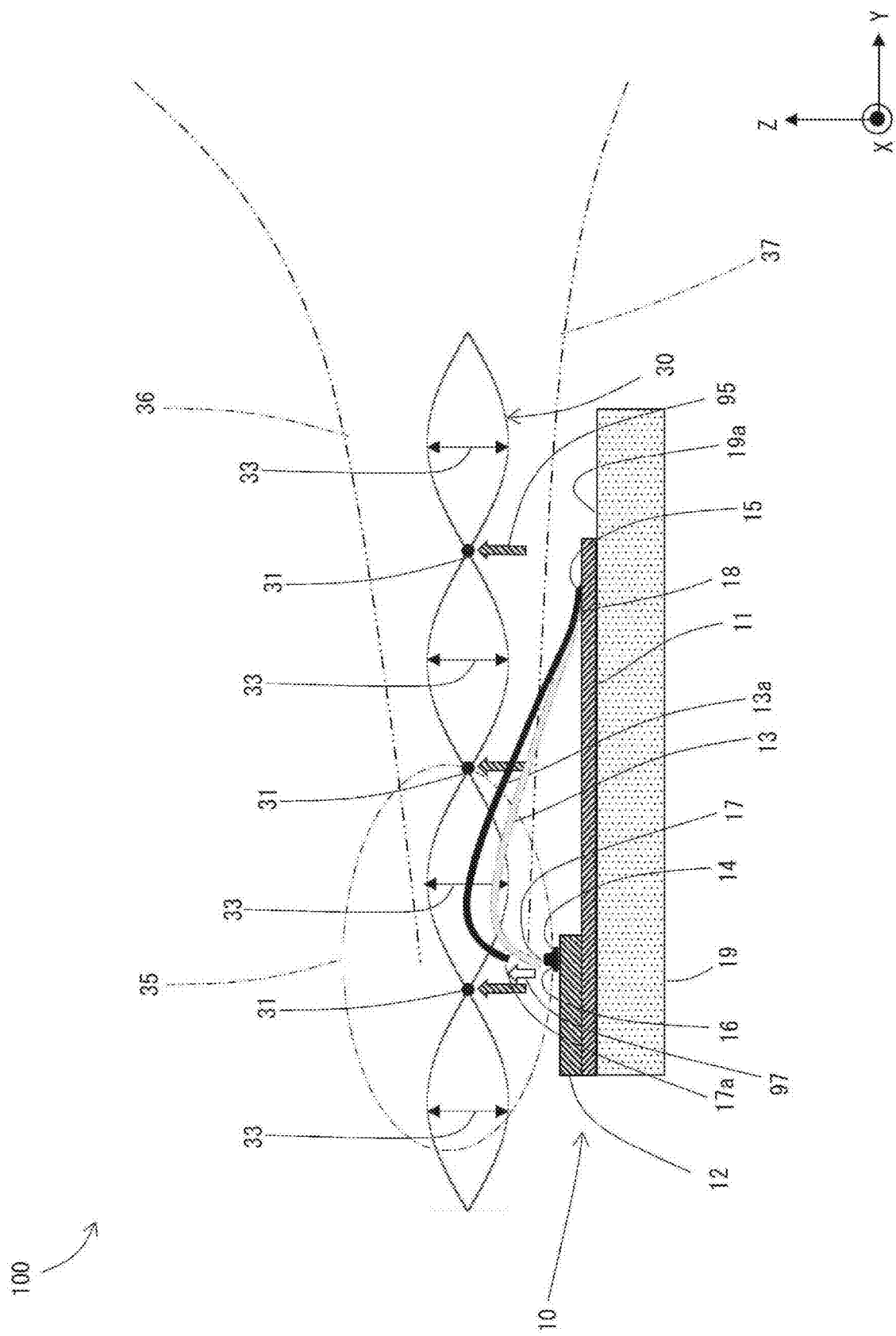
FIG. 7 is a side view illustrating a state in which a ball neck part of the wire is sucked upward when the standing wave is applied to the semiconductor device by using the defect detection device shown in FIG. 1.

Then, with reference to FIGS. 5 to 7, a process for detecting a connection defect of the wire 13 of the semiconductor device 10 by using the defect detection device 100 according to the embodiment is described.

As shown in Step S101 of FIG. 5, the control part 50 initially performs a focus region adjustment process for changing the amplitude and the phase of the ultrasonic wave generated by each of the ultrasonic wave vibrators 23 by using the ultrasonic wave phased array controller 55 in accordance with the size of the inspection target, and adjusting and setting the amplitude and the phase so that the focus region 35 of the standing wave 30 is right above the semiconductor device 10 as the inspection target. At this time, the control part 50 may change the amplitude and the phase of the ultrasonic wave generated by each of the ultrasonic wave vibrators 23 by using the ultrasonic phased array controller 55 based on a sound pressure level detected by a sound pressure sensor or a microphone (not shown) that detects the sound pressure level and is mounted to the position right above of the semiconductor device 10, and adjust and set the amplitude and the phase to an amplitude and a phase at which the sound pressure level falls within a predetermined threshold. In addition, the control part 50 obtains the sound pressure level by using the sound pressure sensor or the microphone to adjust the frequency of the ultrasonic wave generated by the ultrasonic wave vibrator 23 in accordance with the detection target, and sets the frequency to a frequency suitable for the detection target. When the focus region 35 is set to the position right above the semiconductor device 10 through the focus region adjustment process, the position of the node 31 of the sound pressure located in the focus region 35 is also at the position right above the semiconductor device 10.

In the focus region adjustment process, for example, it may also be that, by keeping fine polystyrene particles at the node 31 of the sound pressure in the focus region 35, the focus region 35 is visualized, and the position of the focus region 35 is manually adjusted.

It is noted that the position adjustment process may also be performed manually, so that relative positions of the two ultrasonic wave phased arrays 21, 22 to the semiconductor device 10 are adjusted in accordance with the size of the inspection target, and the position of the node 31 of the sound pressure is right above the semiconductor device 10. In the position adjustment process, if the relative height of the two ultrasonic wave phased arrays 21, 22 relative to the semiconductor device 10 can be changed, for example, it may be that the stage 19 sucking and fixing the semiconductor device 10 is moved in Z direction, and it may also be that the two ultrasonic wave phased arrays 21, 22 are moved in Z direction.

Figure 8:
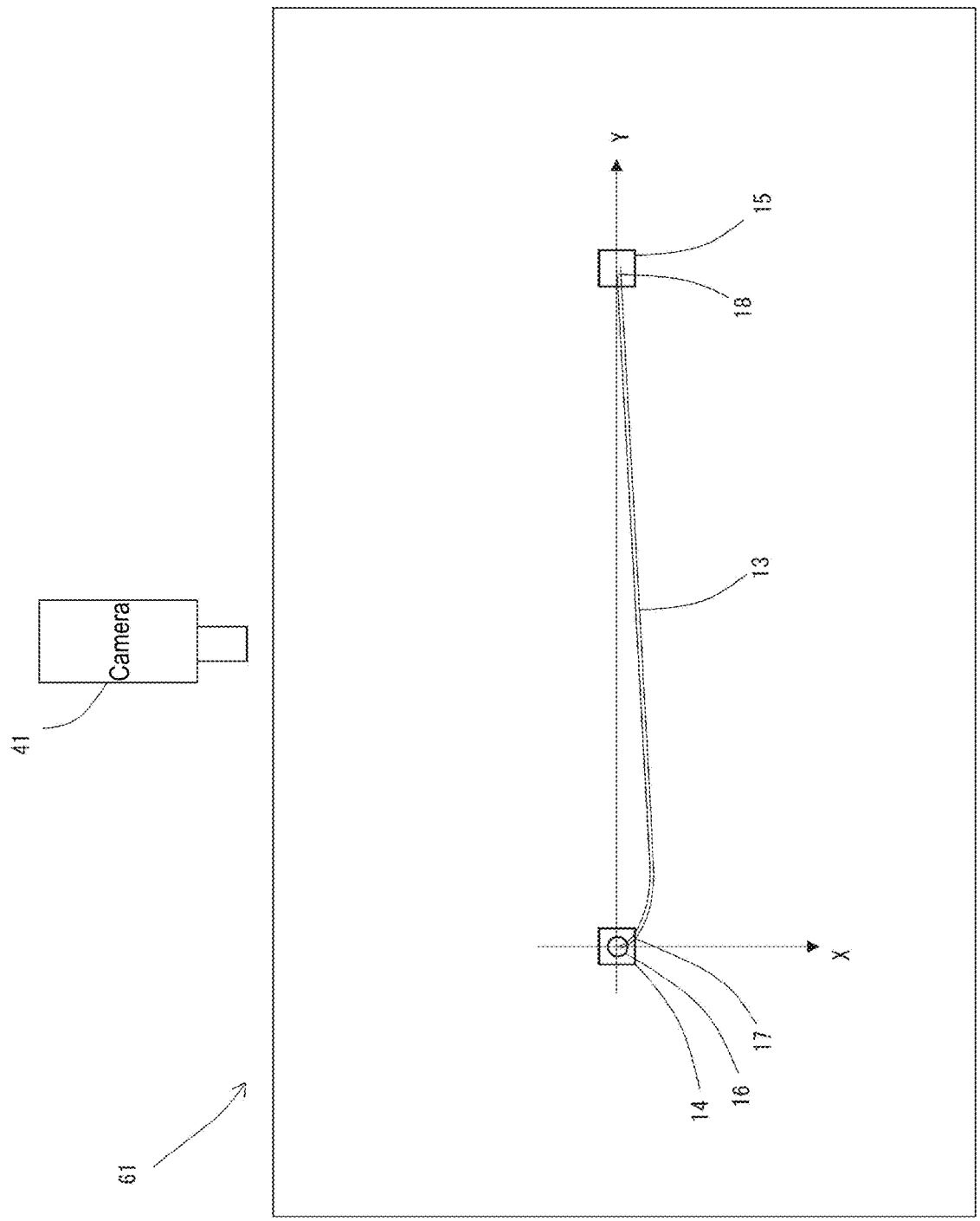
FIG. 8 is a view illustrating a two-dimensional static image of the wire captured by using one of the cameras before the standing wave is applied.
Figure 9:
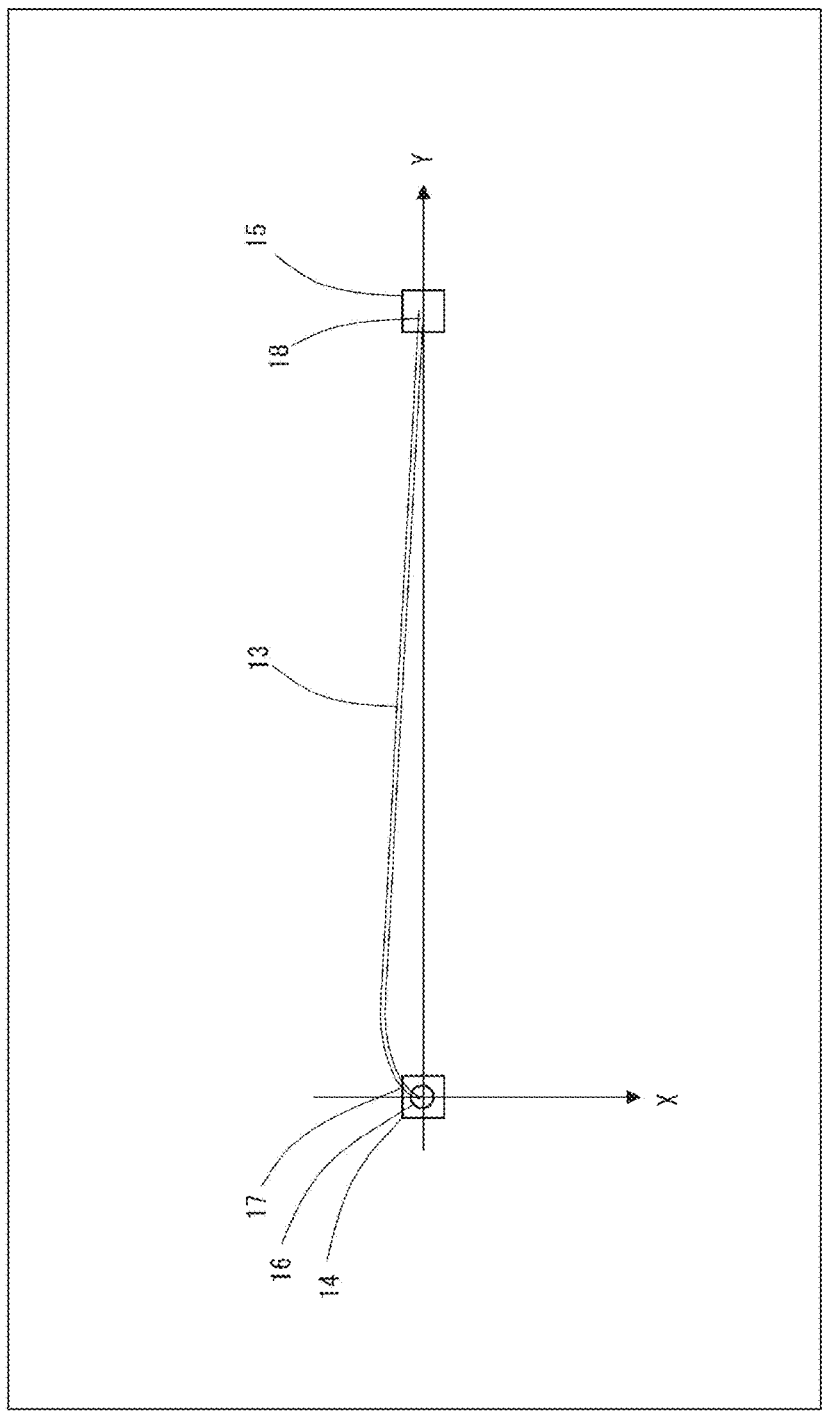
FIG. 9 is a view illustrating a two-dimensional static image of the wire captured by using the other of the cameras before the standing wave is applied.

When the focus region adjustment process ends, the control part 50 proceeds to Step S102 of FIG. 5, and obtains two-dimensional static images 61, 61 (see FIGS. 8 and 9) of the wire 13 of the semiconductor device 10 by using the cameras 41, 42 before the standing wave 30 is applied to the semiconductor device 10, and stores the two-dimensional static images 61, 62 obtained in Step S103 of FIG. 5 in the memory 52 (static image capturing process). As shown in FIG. 1, the cameras 41, 42 are installed above the two sides of the stage 19. Therefore, as shown in FIGS. 8 and 9, the two-dimensional static image 61 captured by the camera 41 and the two-dimensional static image 62 captured by the camera 42 are different images.

Then, as indicated in Step S104 of FIG. 5, the control part 50 drives the two ultrasonic wave phased arrays 21, 22 to generate the standing wave 30, and applies the standing wave 30 to the semiconductor device 10.

When the ultrasonic wave phased arrays 21, 22 are driven to generate the standing wave 30, as shown in FIG. 6, multiple nodes 31 of the sound pressure in the standing wave 30 are present side-by-side at the position right above the wire 13 of the semiconductor device 10, and the focus region 35 is present right above the substrate 11, the semiconductor element 12 of the semiconductor device 10. As described above, the sound wave is enhanced in the focus region 35 or the periphery thereof, and the suction force of the node 31 of the sound pressure is increased.

Therefore, the substrate 11, the semiconductor element 12, and the wire 13 are applied with a suction force sucking toward the node 31 of the sound pressure and are sucked upward. Here, the substrate 11 is sucked and fixed to the upper surface 19*a* of the stage 19, and the semiconductor element 12 is bonded onto the substrate 11. Therefore, the substrate 11 and the semiconductor element 12 are not sucked up by the node 31 of the sound pressure.

In the case where the bonding between a stitch bond part 18 of the wire 13 and the electrode 15 of the substrate 11 is defective and a small gap or crack is present, or in the case where the stitch bond part 18 of the wire 13 and the electrode 15 of the substrate 11 are merely in contact but not bonded to each other, as shown in FIG. 6, the stitch bond part 18 of the wire 13 is sucked upward by the upward suction force of the node 31 of the sound pressure as indicated by a hatched arrow 95 in FIG. 6, and is deformed upward as in a stitch bond part 18*a*. Meanwhile, in the case where the bonding between the wire 13 and the electrode 14 is favorable like that between a ball bond part 16 and the electrode 14 of the semiconductor element 12, the wire 13 does not deform.

Comparatively, in the case where the bonding between the stitch bond part 18 and the electrode 15 of the substrate 11 is favorable, and a crack occurs in a ball neck part 17 on the upper side of the ball bond 16, as shown in FIG. 7, the ball neck part 17 of the wire 13 is sucked upward by the suction force of the node 31 of the sound pressure, and is deformed upward as in a ball neck part 17*a*.

Figure 11:
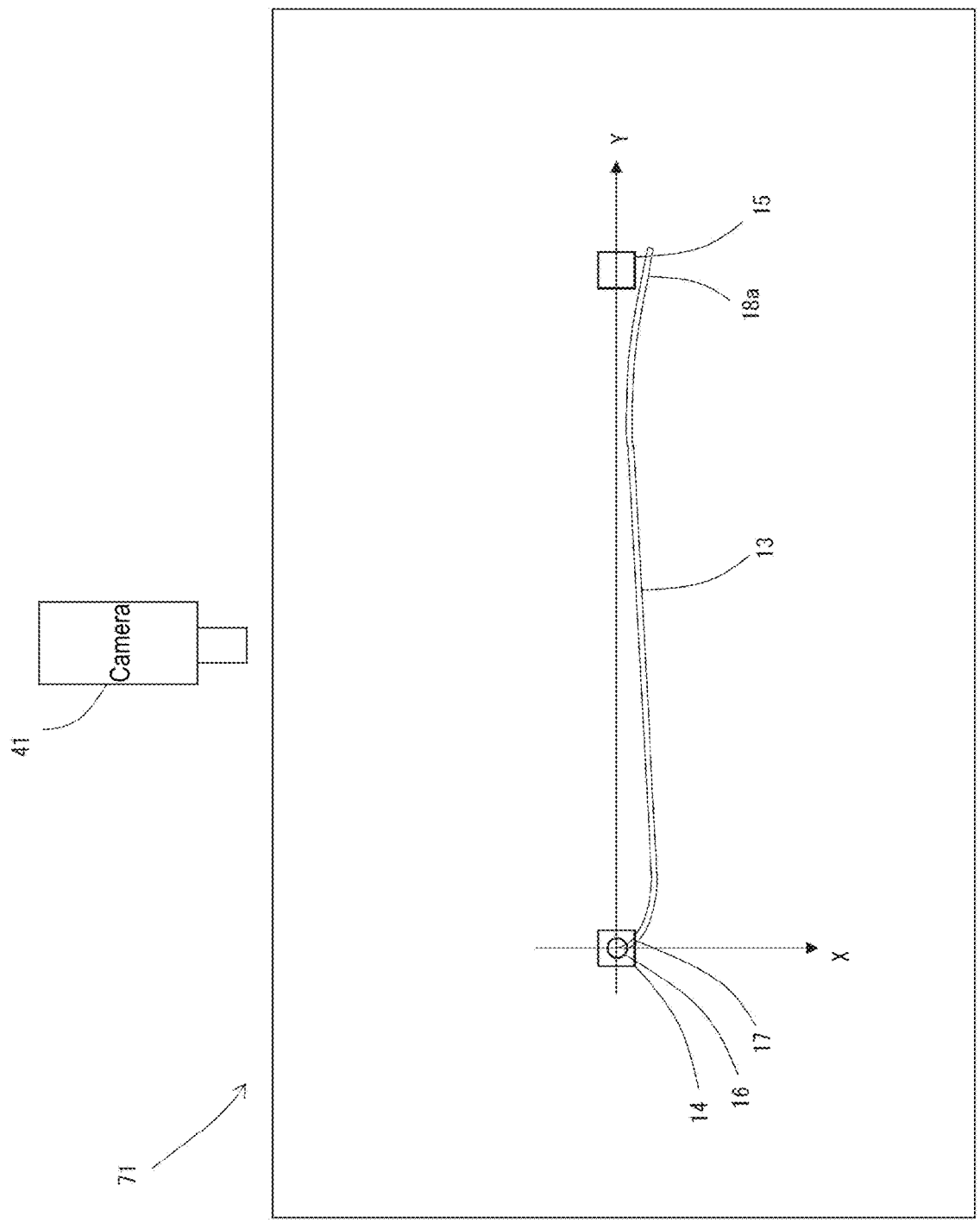
FIG. 11 is a view illustrating a two-dimensional suction image of the wire captured by using one of the cameras in a state in which the standing wave is applied.
Figure 12:
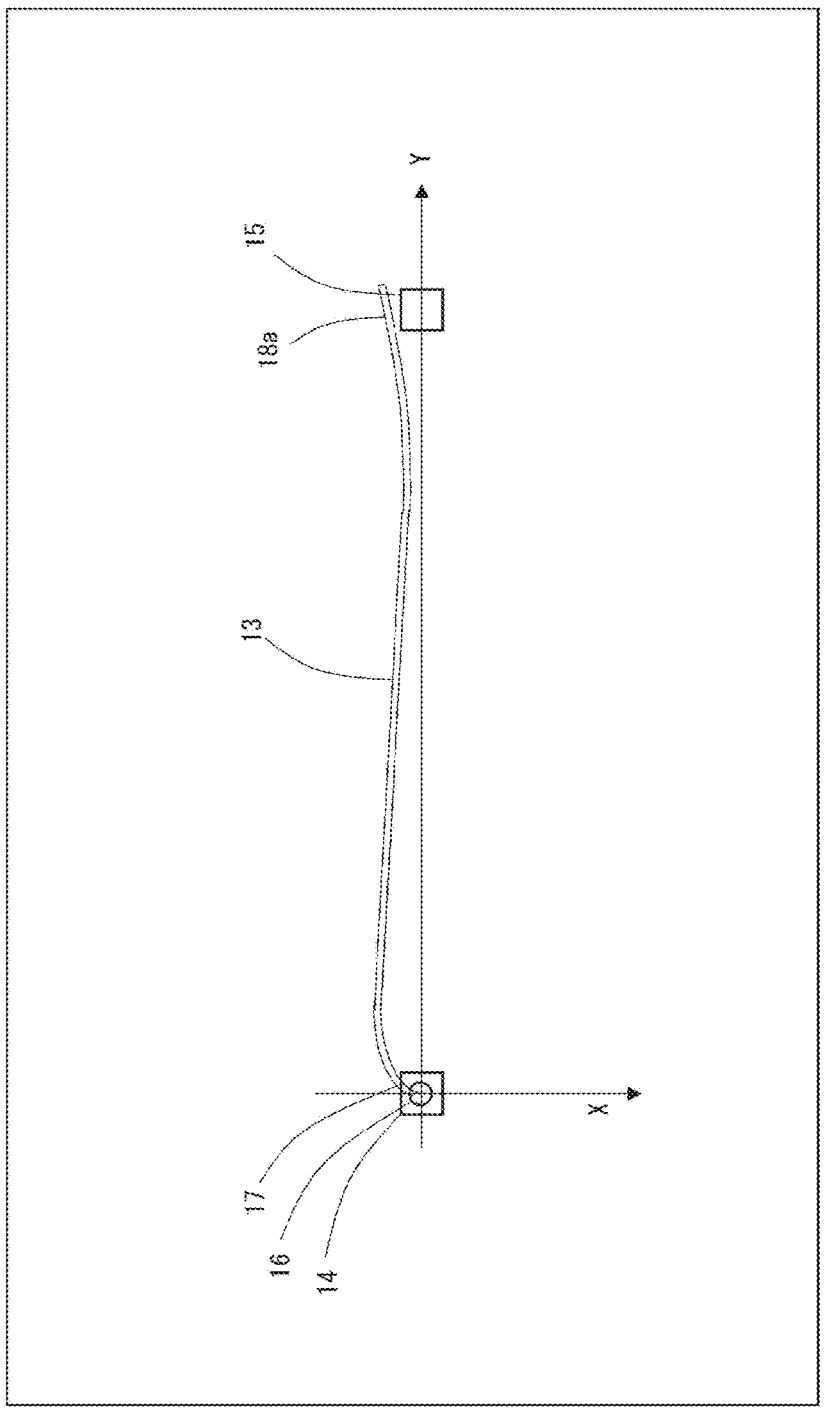
FIG. 12 is a view illustrating a two-dimensional static image of the wire captured by using the other of the cameras in the state in which the standing wave is applied.

Therefore, in the state in which the standing wave 30 generated by the two ultrasonic wave phased arrays 21, 22 is applied to the semiconductor device 10, as shown in Step S105 of FIG. 5, the control part 50 captures two-dimensional suction images 71, 72 (see FIGS. 11, 12) of the wire 13 of the semiconductor device 10 by using the cameras 41, 42, and stores the two-dimensional images 71, 72 in the memory 52 in Step S106 (suction image capturing process). Like the two-dimensional static images 61, 62 described above, since the cameras 41, 42 are installed above the two sides of the stage 19, the two-dimensional suction image 71 captured by the camera 41 and the two-dimensional suction image 72 captured by the camera 42 are different images.

Figure 10:
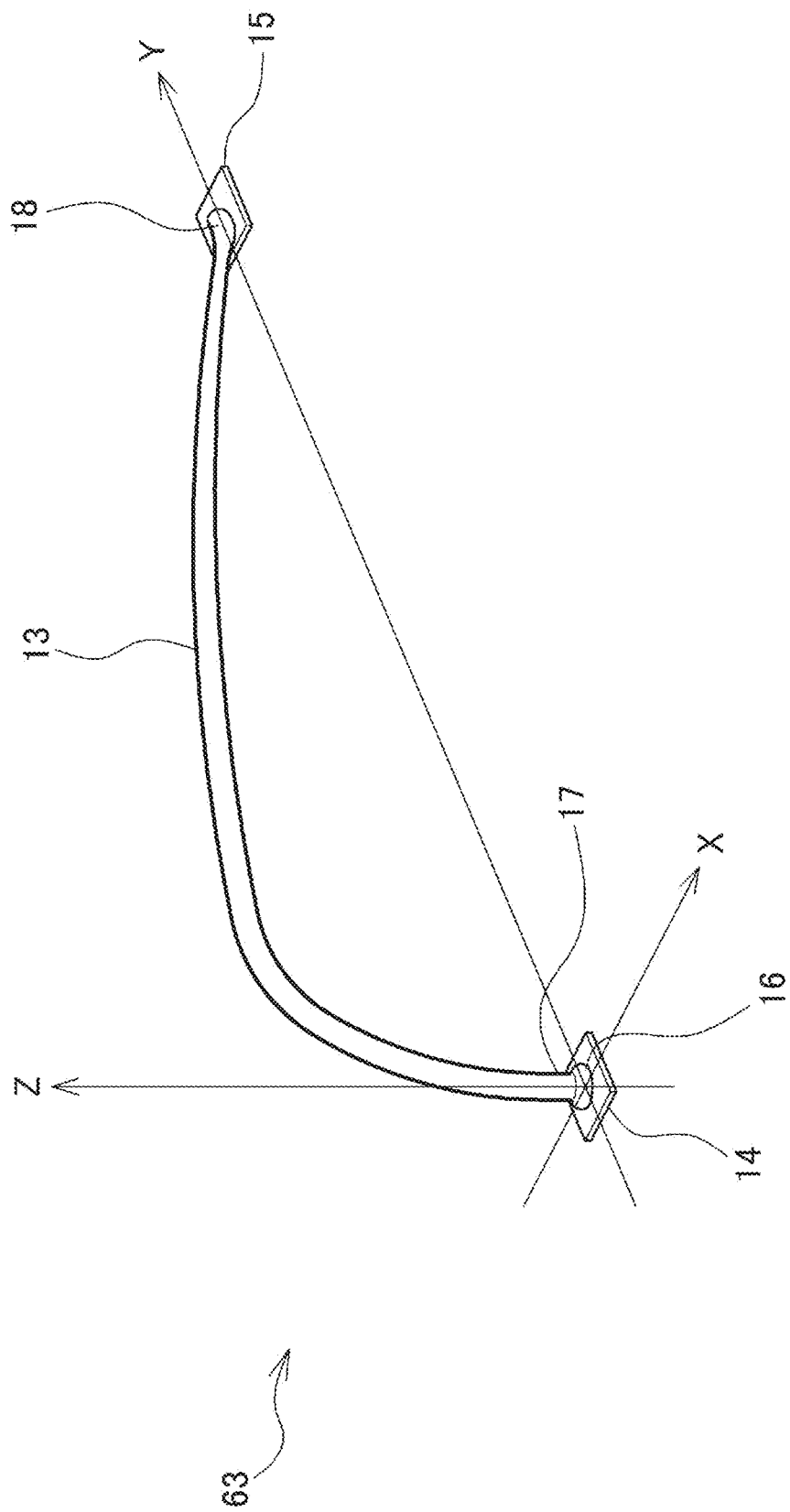
FIG. 10 is a view illustrating a three-dimensional static image of the wire before the standing wave is applied.
Figure 13:
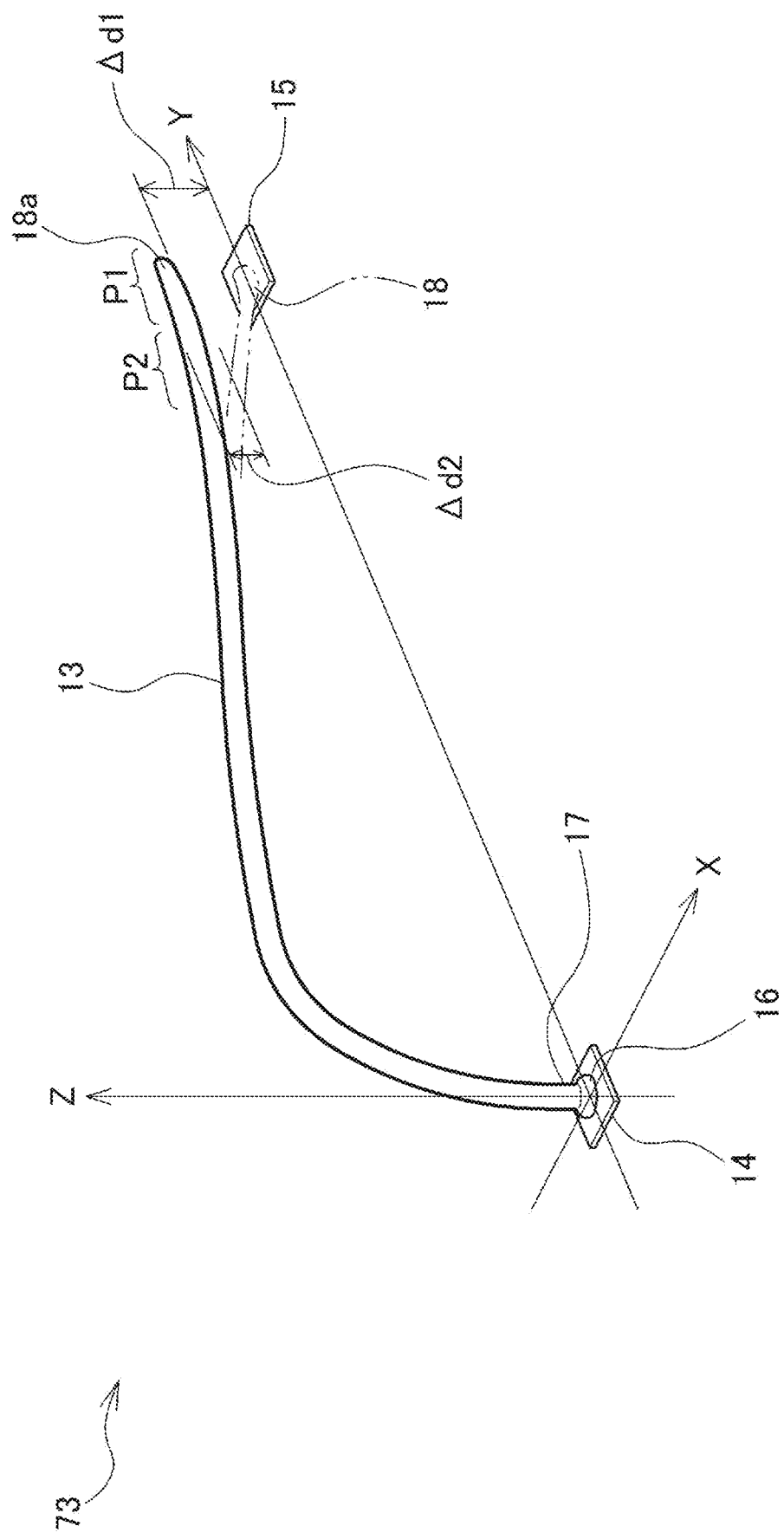
FIG. 13 is a view illustrating a three-dimensional suction image of the wire in the state in which the standing wave is applied.

In Step S107 of FIG. 5, the control part 50 reads the two-dimensional static images 61, 62 respectively captured by the two cameras 41, 42 from the memory 52, and, as shown in FIG. 10, generates a three-dimensional static image 63 of the wire 13 of the semiconductor device 10 before the standing wave 30 is applied. Similarly, the control part 50 reads the two-dimensional suction images 71, 72 of the wire 13 respectively captured by the two cameras 41, 42 from the memory 52, and, as shown in FIG. 13, generates a three-dimensional suction image 73 of the wire 13 of the semiconductor device 10 in the state in which the standing wave 30 is applied. Here, the three-dimensional static image 63 and the three-dimensional suction image 73 are generated to favorably detect a difference between the images of the wire 13 before and after deformation even if the wire 13 deforms in the upper direction, as shown in FIGS. 6 and 7.

Then, in Step S108 of FIG. 5, the control part 50 compares the three-dimensional static image 63 and the three-dimensional suction image 73 that are generated. As described above with reference to FIG. 6, in the case where there is no bonding defect in the wire 13, the wire 13 does not deform, and in the case where there is a bonding defect in the wire 13, the wire 13 deforms. Therefore, as shown in Step S107 of FIG. 5, the control part 50 compares the three-dimensional static image 63 before the standing wave 30 is applied and the three-dimensional suction image 73 in or after the state in which the standing wave 30 is applied, and calculates a differential $\Delta d$ therebetween for each portion, as shown in FIG. 13. FIG. 13 shows, as an example, differentials $\Delta d1$ and $\Delta d2$ at two portions P1, P2 in the vicinity of the stitch bond part 18 of the wire 13. At this time, the control part 50 calculates the differential $\Delta d$ of each portion for all of the multiple wires 13 of the semiconductor device 10 as shown in FIG. 2.

Then, in Step S109 of FIG. 6, the control part 50 determines whether there is a portion in which the differential $\Delta d$ is greater than a threshold $\Delta S$, and, in the case where the differential $\Delta d$ is greater than the threshold $\Delta S$, determines that it is YES in Step S109 of FIG. 6 and proceeds to Step S110 of FIG. 6 to output a wire defect detection signal to the outside. In addition, in the case where the control part 50 determines that it is NO in Step S109 of FIG. 6, the control part 50 proceeds to Step S111 of FIG. 6 and outputs a wire favorable signal to the outside (defect detection process).

Here, the wire defect detection signal is a signal indicating that a bonding defect occurs in at least one of the wires 13 of the semiconductor device 10 shown in FIG. 2, and the wire favorable signal is a signal indicating that the bonding of all of the wires 13 of the semiconductor device 10 shown in FIG. 2 is favorable.

As described above, after capturing the two-dimensional static images 61, 62 of the semiconductor device 10 before the standing wave 30 is applied by using the cameras 41, 42, the defect detection device 10 of the embodiment applies the standing wave 30 generated by the set of ultrasonic wave phased arrays 21, 22 to the semiconductor device 30, sucks the portion of the bonding defect of the wire 13 upward by the node 31 of the sound pressure of the standing wave 30, captures the two-dimensional suction images 71, 72 of the semiconductor device 10 including the deformed wire 13 by using the cameras 41, 42, generates the three-dimensional static image 63 and the three-dimensional suction image 73, and detects the defect of the wires 13 by comparing the three-dimensional static image 63 and the three-dimensional suction image 73 that are generated. In this way, the defect detection device 100 of the embodiment can detect a defect of the wires 13 within a short time by using a simple configuration.

The two-dimensional suction images 71, 72 and the three-dimensional suction image 73 as described above are first images of the semiconductor device 10 in a first state in which the suction force is applied to the wire 13, and the two-dimensional static images 61, 62 and the three-dimensional static image 63 are images of a second state in which the suction force is smaller than that of the first state. Moreover, the suction image capturing process is a first image capturing process, and the static image capturing process is a second image capturing process.

Although the above description is made by describing that the three-dimensional static image 63 and the three-dimensional suction image 73 are compared to perform defect detection, the invention is not limited thereto. For example, it may also be that the two-dimensional static images 61, 62 and the two-dimensional suction images 71, 72 captured by the cameras 41, 42 are compared to detect the defect of the wire 13.

In addition, although the above description is made by describing that whether a bonding defect occurs in at least one of the wires 13 or the bonding of all of the wires 13 is favorable is determined, the invention is not limited thereto. It may also be that a position where the differential $\Delta d$ is equal to or greater than the threshold $\Delta S$ is specified and displayed as a defect position on the image of the semiconductor device 10.

Moreover, although in the defect detection device 100 described above, the ultrasonic wave phased arrays 21, 22 in which tens or hundreds of the ultrasonic wave vibrators 23 are arranged in a plane-like arrangement, the invention is not limited thereto. For example, it may also be configured that the ultrasonic wave phased arrays 21, 22 are configured by disposing multiple ultrasonic wave speakers in a plane-like arrangement.

Moreover, the standing wave generator 20 generating the standing wave 30 may also be configured by using ultrasonic wave speakers as ultrasonic wave generators in place of the ultrasonic phased arrays 21, 22 and disposing the ultrasonic wave speakers to face each other.

Figure 14:
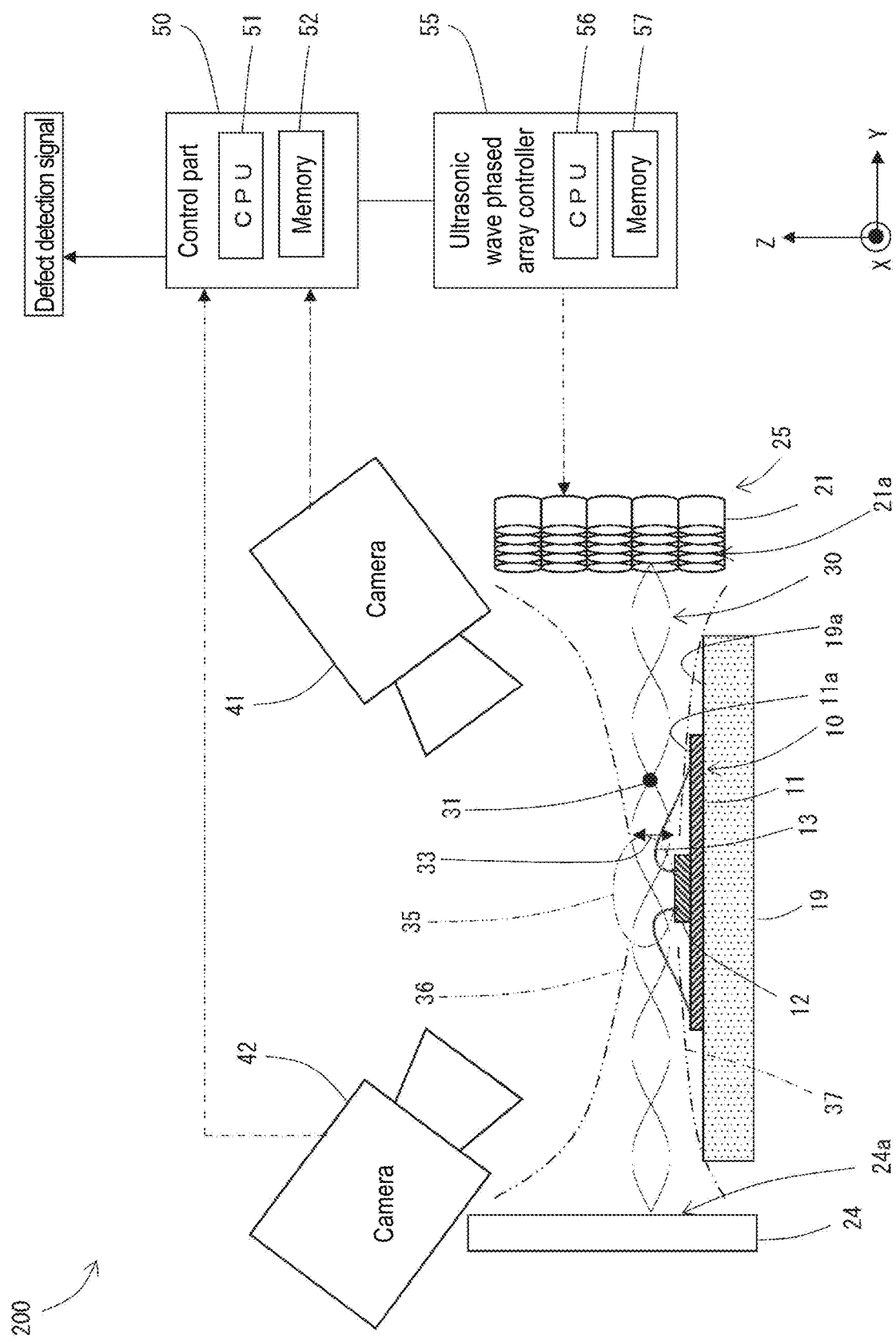
FIG. 14 is a system diagram illustrating a configuration of a defect detection device according to another embodiment.

In the following, a defect detection device 200 according to another embodiment is described with reference to FIG. 14. In place of the standing wave generator 20 formed by the two ultrasonic wave phased arrays 21, 22 of the defect detection device 100 described above with reference to FIGS. 1 to 13, the defect detection device 200 is formed with a standing wave generator 25 which generates the standing wave 30 by using one ultrasonic wave phased array 21 and a reflective plate 24 disposed on the left side of the stage 19 to face the ultrasonic wave phased array 21. The rest are the same as the defect detection device 100 described above. Therefore, like components are labeled with like reference symbols and the description thereof is omitted.

Here, the reflective plate 24 may be made from metal or formed from resin or glass, as long as the reflective plate 24 has a reflective surface 24a reflecting ultrasonic waves. In addition, the reflective surface 24a reflecting ultrasonic waves is not particularly limited as long as the reflective surface 24a is a smooth flat surface capable of reflecting ultrasonic waves.

Figure 15:
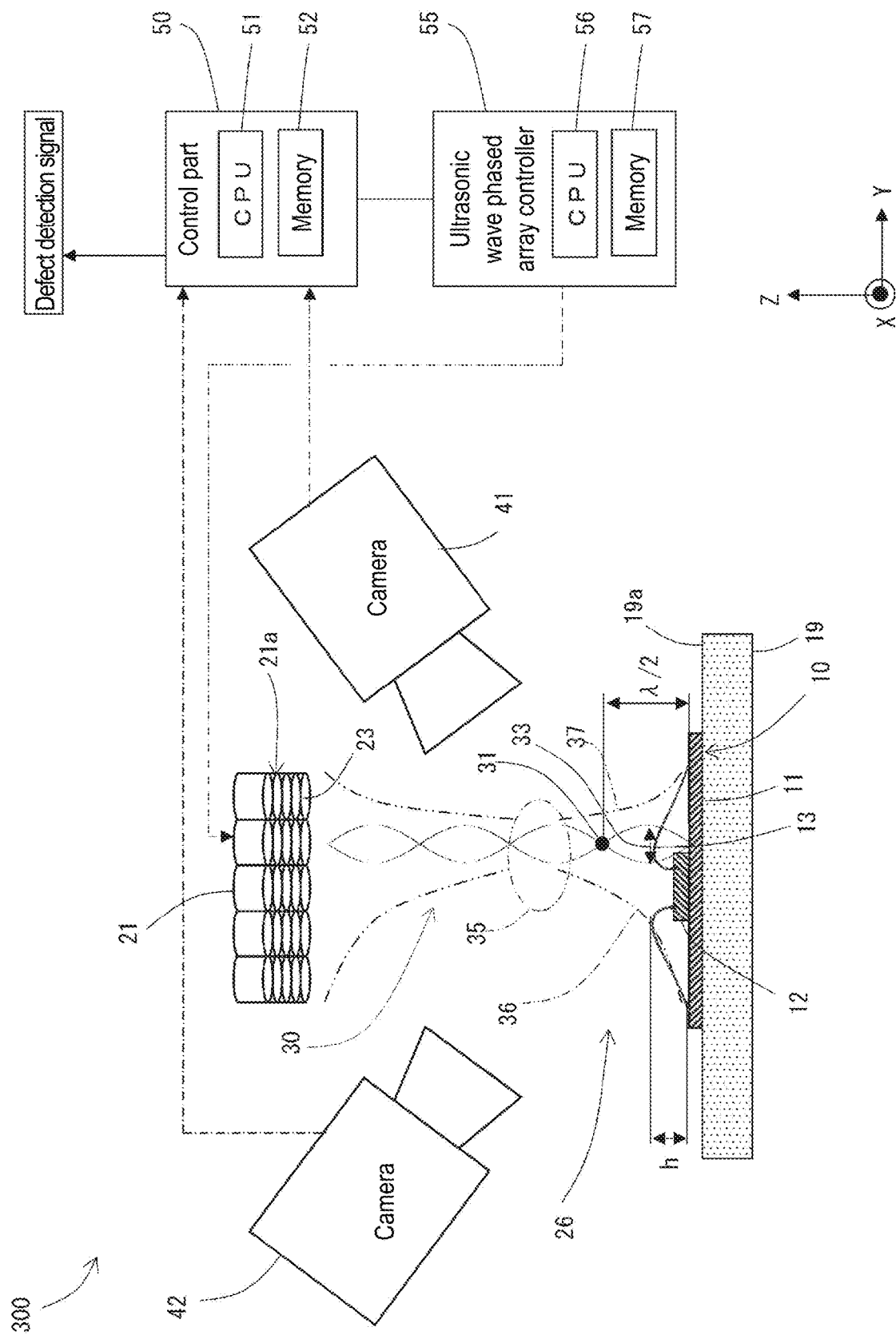
FIG. 15 is a system diagram illustrating a configuration of a defect detection device according to yet another embodiment.

In the following, a defect detection device 300 according to another embodiment is described with reference to FIGS. 15 to 18. As shown in FIG. 15, the ultrasonic wave phased array 21 of the defect detection device 300 is disposed so that the ultrasonic wave generation surface 21a faces the upper surface 19a of the stage 19 above the stage 19. In addition, the defect detection device 300 is configured so that the ultrasonic waves generated by the ultrasonic wave phased array 21 are reflected by the surface 11a of the substrate 11 of the semiconductor device 10 sucked and fixed onto the stage 19, and the standing wave 30 is generated between the ultrasonic wave phased array 21 and the surface 11a of the substrate 11 of the semiconductor device 10. The surface 11a of the substrate 11 is configured as the reflective surface reflecting ultrasonic waves, and the ultrasonic wave phased array 21 and the surface 11a of the substrate 11 form a standing wave generator 26 generating the standing wave 30. In the defect detection device 300, the ultrasonic wave phased array 21 is disposed above the stage 19, so the defect detection device 300 can be disposed in a smaller configuration space.

In the defect detection device 300 shown in FIG. 15, the frequency of the ultrasonic waves generated by the ultrasonic wave phased array 21 is adjusted so that the node 31 of the sound pressure of the standing wave 30 is right above the semiconductor device 10. As shown in FIG. 15, the node 31 of the sound pressure of the standing wave 30 is generated at a height of λ/2 that is a half of the wavelength λ of the ultrasonic wave from the surface 11a of the substrate 11. In the case where the height from the surface 11a of the substrate 11 to the uppermost part of the wire 13 is h, the frequency is set so that λ/2 is slightly greater than h. For example, in the case where the height h of the wire 13 is 500 (μm), the frequency is set to 200 to 300 (kHz).

Figure 16:
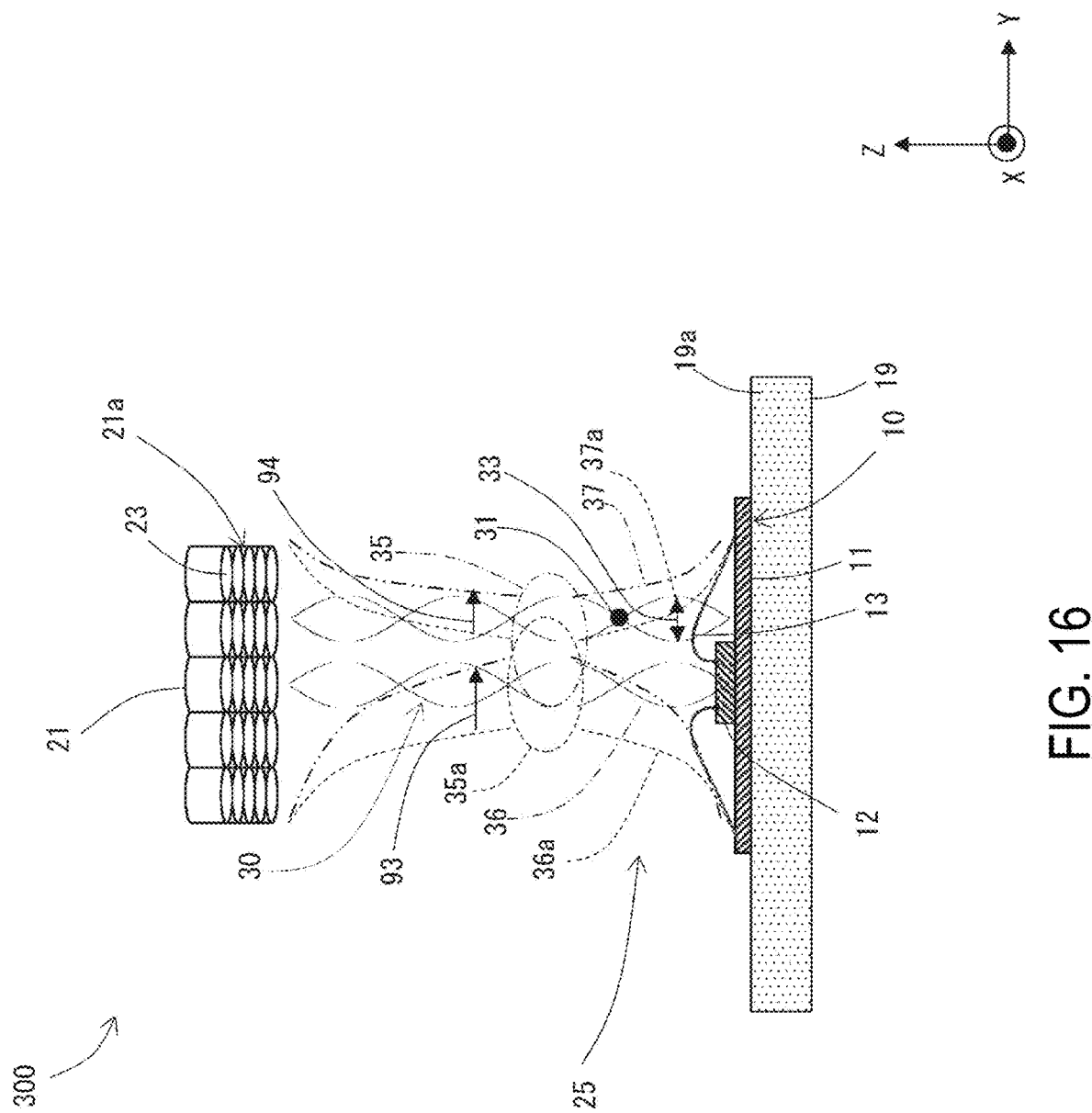
FIG. 16 is a side view illustrating a horizontal movement of a focus region of a standing wave generated by an ultrasonic wave phased array of the defect detection device shown in FIG. 15.

As shown in FIG. 16, in the defect detection device 300, the focus region 35 is generated at a height that is in the middle between the ultrasonic wave phased array 21 and the surface 11a of the substrate 11 and slightly closer to the substrate 11. As described above with reference to FIG. 3, by adjusting the amplitude and the phase of each of the ultrasonic wave vibrators 23 of the ultrasonic wave phased array 21, the focus region 35 can be moved in XY direction along the upper surface 19a of the stage 19. For example, as shown in FIG. 16, by adjusting the amplitude and the phase of the ultrasonic wave generated by each of the ultrasonic wave vibrators 23, the shape of the ultrasonic beam is changed from the shape indicated by the broken lines 36a, 37a to the shape indicated by the two-dot chain lines 36, 37 as indicated by arrows 93, 94, and the position of the focus region 35 in Z direction can be moved in Y direction from the focus region 35a right above the semiconductor element 12 as indicated by the broken line to a position right above the wire 13 as the focus region 35 indicated by the two-dot chain line. Accordingly, the center of the standing wave 30 can be moved to the vicinity of the wire 13 that is an inspection target component.

Figure 17:
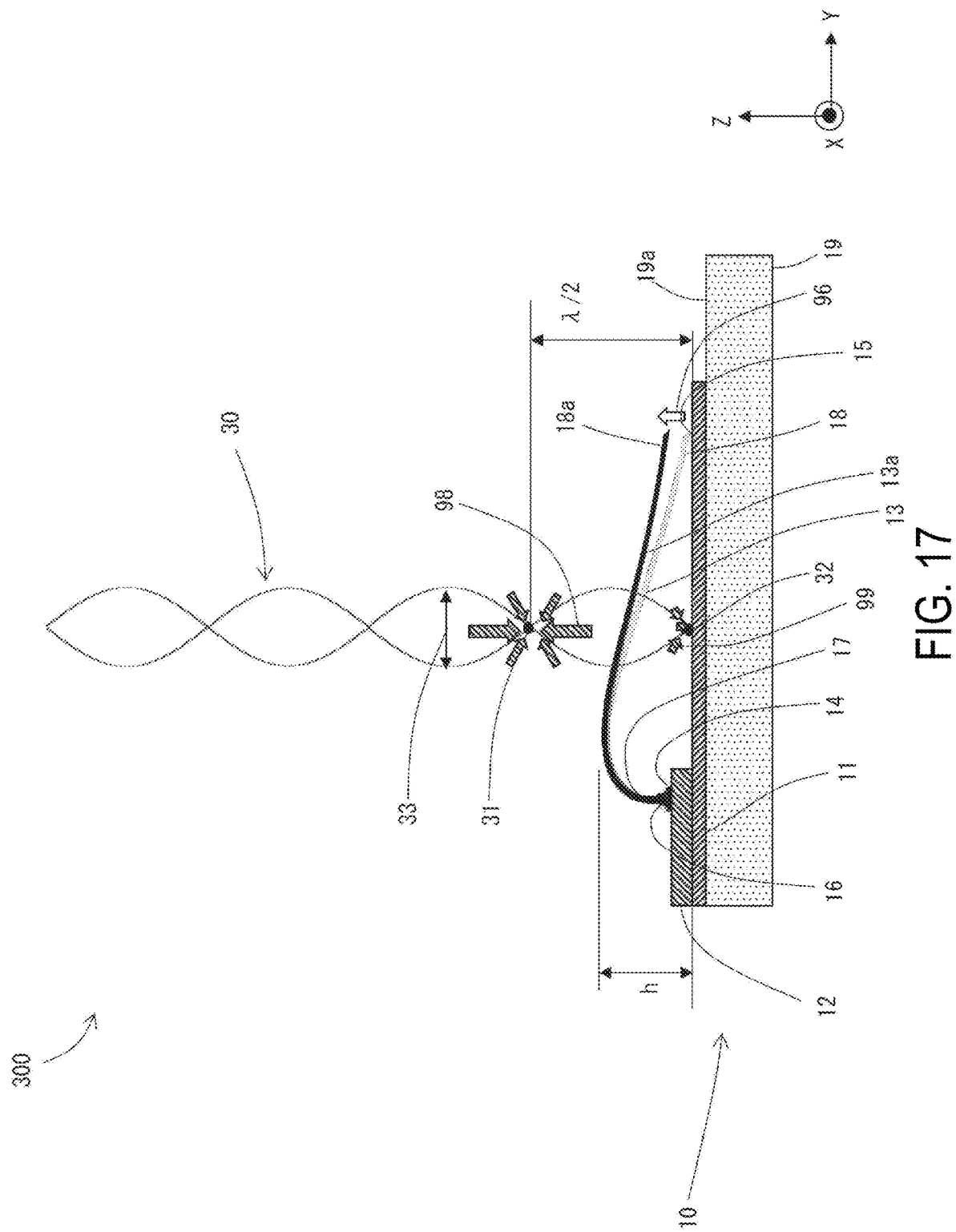
FIG. 17 is a side view illustrating a state in which a stitch bond part of a wire is sucked upward when the standing wave is applied to the semiconductor device by using the defect detection device shown in FIG. 15.
Figure 18:
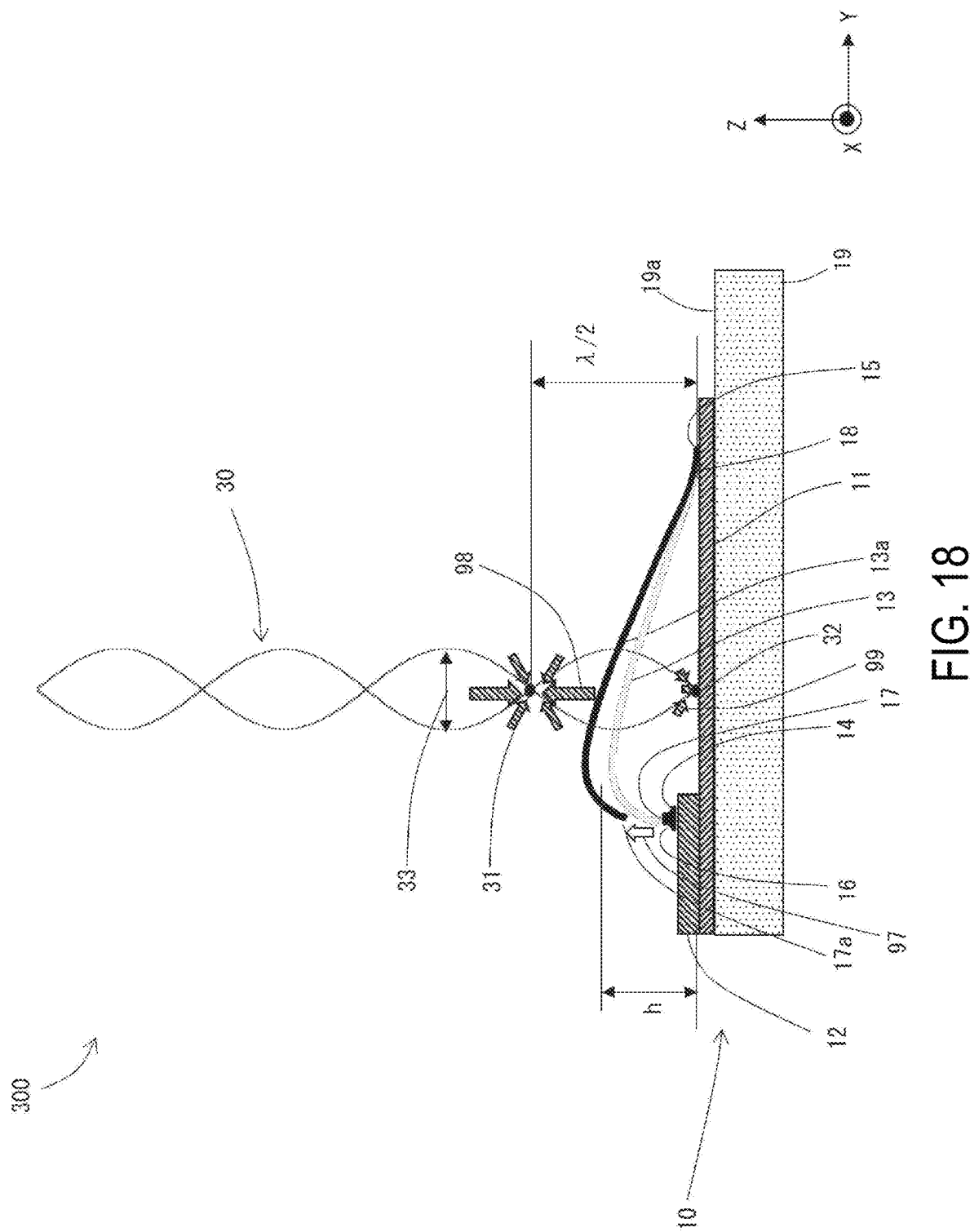
FIG. 18 is a side view illustrating a state in which a ball neck part of the wire is sucked upward when the standing wave is applied to the semiconductor device by using the defect detection device shown in FIG. 15.

Then, with reference to FIGS. 17 to 18, a process for detecting a bonding defect of the wire 13 by using the defect detection device 300 is described. The description regarding an operation same as the operation of the defect detection device 100 described above is omitted.

The control part 50 adjusts the frequency of the ultrasonic wave generated by the ultrasonic wave phased array 21 so that initially the position of the node 31 of the sound pressure of the standing wave 30 is located right above the wire 13. In addition, in accordance with the configuration of the semiconductor device 10, the amplitude and the frequency of each of the ultrasonic wave vibrators 23 of the ultrasonic wave phased array 21 are adjusted to adjust the position of the focus region 35 in XY direction (focus region position adjustment process).

As shown in FIG. 17, when the standing wave 30 is applied to the wire 13 of the semiconductor device 10, the node 31 of the sound pressure is generated at a position at the height of λ/2 from the substrate 11. As described above, the frequency of the ultrasonic wave generated by the ultrasonic wave phased array 21 is adjusted, so that the position of the node 31 of the sound pressure is slightly greater than the height to the uppermost part of the wire 13. Therefore, as shown in FIG. 17, the node 31 of the sound pressure is generated slightly upper of the wire 13. As indicated by a hatched arrow 98 in FIG. 17, the node 31 of the sound pressure applies a force toward the node 31 of the sound pressure to particles in the periphery.

In addition, in the defect detection device 300, the ultrasonic wave generated by the ultrasonic wave phased array 21 is reflected by the surface 11a of the substrate 11 to generate the standing wave 30. Therefore, a node 32 of the sound pressure is also generated on the surface 11a of the substrate 11 reflecting the ultrasonic wave generated by the ultrasonic wave phased array 21. As indicated by a hatched arrow 99 in FIG. 17, the node 32 of the sound pressure applies a force toward the node 32 of the sound pressure to particles in the periphery.

The node 31 of the sound pressure sucks the wire 13 upward to apply an upward pulling force to the wire 13. Meanwhile, the node 32 of the sound pressure sucks the wire 13 downward to apply a downward pulling force to the wire 13. However, the suction force generated at the node 32 of the sound pressure is much smaller than the suction force generated at the node 31 of the sound pressure. Therefore, the wire 13 is sucked in the upper direction toward the node 31 of the sound pressure. In the case where the bonding between the stitch bond part 18 of the wire 13 and the electrode 15 of the substrate 11 is defective, the stitch bond part 18 of the wire 13 becomes the deformed stitch bond part 18a that deforms upward.

Similarly, in the case where there is a crack at the ball neck part 17 as shown in FIG. 18, the ball neck part 17 of the wire 13 is sucked upward by the suction force of the node 31 of the sound pressure, and is deformed upward like the ball neck part 17a.

Therefore, like the defect detection device 100, after capturing the two-dimensional static images 61, 62 of the wire 13 of the semiconductor device 10 by using the cameras 41, 42 before the standing wave 30 is applied, the defect detection device 300 applies the standing wave 30 to the semiconductor device 10, sucks the portion of the bonding defect of the wire 13 upward by using the standing wave 30, captures the two-dimensional suction images 71, 72 of the semiconductor device 10 including the deformed wire 13 by using the cameras 41, 42, generates the three-dimensional static image 63 and the three-dimensional suction image 73, and detects the defect of the wires 13 by comparing the three-dimensional static image 63 and the three-dimensional suction image 73 that are generated. In this way, the defect detection device 300 of the embodiment can detect a defect of the wires 13 within a short time by using a simple configuration.

When the defect detection device 300 performs defect detection on the wire 13, it may also be that the amplitude and the phase of each of the ultrasonic wave vibrators 23 of the ultrasonic wave phased array 21 are adjusted to move the position of the focus region 35 in XY direction while capturing the two-dimensional suction images 71, 72. Accordingly, since the two-dimensional suction images 71, 72 are captured in the state in which the region where the standing wave 30 is strong is located above the wire 13, the deformation of the wire 13 can be increased, and the accuracy of defect detection on the wire 13 can be increased.

In addition, when the defect detection device 300 performs defect detection on the wire 13, it may also be that the position of the focus region 35 in XY direction is moved in accordance with the size and the shape of the inspection target while capturing the two-dimensional suction images 71, 72. Accordingly, even in the case where the inspection target is large or the shape is complicated, the defect of the entire inspection target can be more accurately detected without moving the ultrasonic phased array 21 or the stage 19.

In the above description, the two-dimensional static images 61, 62 are captured before the standing wave 30 is applied to the semiconductor device 10, and then the two-dimensional suction images 71, 72 of the semiconductor device 10 are captured in the state in which the standing wave 30 is applied. However, the invention is not limited thereto. For example, in the case where, after the standing wave 30 is applied to the wire 13 or when the standing wave 30 is stopped, the deformation of the wire 13 returns to the original state or a state close to the original state, for example, it may also be that the two-dimensional suction images 71, 72 of the semiconductor device 10 in the state in which the standing wave 30 is applied to the semiconductor device 10 are captured, and then the two-dimensional static images 61, 62 are captured after the standing wave 30 is stopped. In addition, in the case where there is a correlation between the deformation of the wire 13 and the output of the ultrasonic wave phased arrays 21, 22, in place of the two-dimensional static images 61, 62, two-dimensional low suction images in a second state that is a low suction force state where the output of the ultrasonic wave phased arrays 21, 22 is smaller than the first state are captured, and the two-dimensional low suction images are compared with the two-dimensional suction images 71, 72 of the first state to perform defect detection. Moreover, it may also be that a three-dimensional low suction image is generated from the two-dimensional low suction images, and the three-dimensional low suction image is compared with the three-dimensional suction image 73 to perform defect detection.

What is claimed is:

1. A defect detection device, detecting a defect of an inspection target in which a bonding article is bonded to a bonded article, the defect detection device comprising:
    a standing wave generator, generating a standing wave, and applying the standing wave that is generated to the inspection target to apply a suction force to the bonding article;
    an image capturing device, capturing an image of the inspection target; and
    a control part, adjusting an operation of the standing wave generator and performing defect detection on the inspection target,
    wherein the control part captures, by using the image capturing device, a first image of the inspection target of a first state in which the suction force is applied to the bonding article and a second image of the inspection target of a second state in which the suction force applied to the bonding article is smaller than the first state, and
    the first image of the first state and the second image of the second state are compared to perform defect detection on the inspection target.

2. The defect inspection device as claimed in claim 1, wherein the standing wave generator is at least one set of ultrasonic wave generators disposed to face each other.

3. The defect inspection device as claimed in claim 1, wherein the standing wave generator is formed by an ultrasonic wave generator and a reflective surface disposed to face the ultrasonic wave generator.

4. The defect inspection device as claimed in claim 1, wherein the standing wave generator is disposed so that a position of a node of a sound pressure of the standing wave is right above the inspection target.

5. The defect inspection device as claimed in claim 2, wherein the ultrasonic wave generator is an ultrasonic wave phased array formed by a plurality of ultrasonic wave speakers or ultrasonic wave vibrators, and
    one or more of a frequency, an amplitude, and a phase of an ultrasonic wave generated by each of the ultrasonic wave speakers or each of the ultrasonic wave vibrators are set, so that a focus region of the standing wave generated between the set of ultrasonic wave phased arrays is right above the inspection target.

6. The defect inspection device as claimed in claim 3, wherein the ultrasonic wave generator is an ultrasonic wave phased array formed by a plurality of ultrasonic wave speakers or ultrasonic wave vibrators, and
    one or more of a frequency, an amplitude, and a phase of an ultrasonic wave generated by each of the ultrasonic wave speakers or each of the ultrasonic wave vibrators are set, so that a focus region of the standing wave generated between the ultrasonic wave phased array and the reflexive surface is right above the inspection target.

7. The defect inspection device as claimed in claim 5, comprising a stage, wherein the bonded article is sucked and fixed to an upper surface of the stage,
    wherein the ultrasonic wave phased array generates ultrasonic waves traveling in a direction along the upper surface of the stage, and
    one or more of a frequency, an amplitude, and a phase of the ultrasonic wave generated by each of the ultrasonic wave speakers or each of the ultrasonic wave vibrators are set, so that the focus region of the standing wave is right above the bonding article of the inspection target.

8. The defect inspection device as claimed in claim 3, comprising a stage, wherein the bonded article is sucked and fixed to an upper surface of the stage,
    the reflexive surface is a surface of the bonded article sucked and fixed to the upper surface of the stage, and
    the ultrasonic wave generator is disposed above the stage, and generates an ultrasonic wave with a frequency that a position of a node of a sound pressure of the standing wave generated between the ultrasonic wave generator and the surface of the bonded article is right above the bonding article.

9. The defect inspection device as claimed in claim 8, wherein the ultrasonic wave generator is an ultrasonic wave phased array formed by a plurality of ultrasonic wave speakers or ultrasonic wave vibrators.

10. The defect inspection device as claimed in claim 1, wherein the inspection target is a semiconductor device formed by a substrate, a semiconductor element installed to the substrate, and a wire bonded to an electrode of the semiconductor element and an electrode of the substrate to connect each of the electrodes, and
    the bonded article of the inspection target is the substrate and the semiconductor element installed to the substrate, and the bonding article of the inspection target is the wire.

11. A defect detection method for detecting a defect of an inspection target in which a bonding article is bonded to a bonded article, the defect detection method comprising:
a process of preparing a defect detection device comprising: a standing wave generator, generating a standing wave and applying the standing wave that is generated to the inspection target to apply a suction force to the bonding article; and an image capturing device, capturing an image of the inspection target;
a first image capturing process, capturing, by using the image capturing device, a first image of the inspection target of a first state in which the suction force is applied to the bonding article;
a second image capturing process, capturing, by using the image capturing device, a second image of the inspection target of a second state in which the suction force applied to the bonding article is smaller than the first state; and
a defect detection process, comparing the first image of the first state and the second image of the second state to perform defect detection on the inspection target.

12. The defect inspection method as claimed in claim 11, comprising a position adjustment process, adjusting a relative position of the standing wave generator to the inspection target, so that a position of a node of a sound pressure of the standing wave is right above the inspection target.

13. The defect inspection method as claimed in claim 11, wherein the standing wave generator is configured by disposing ultrasonic wave phased arrays facing each other, the ultrasonic wave phased arrays being formed by a plurality of ultrasonic wave speakers or ultrasonic wave vibrators, and
the defect inspection method comprises a focus region adjustment process, adjusting one or more of a frequency, an amplitude, and a phase of an ultrasonic wave generated by each of the ultrasonic wave speakers or each of the ultrasonic wave vibrators, so that a focus region of the standing wave generated between the ultrasonic wave phased arrays is right above the inspection target.

14. The defect inspection method as claimed in claim 11, wherein the ultrasonic wave generator is formed by an ultrasonic wave phased array formed by a plurality of ultrasonic wave speakers or ultrasonic wave vibrators and a reflexive surface disposed to face the ultrasonic wave phased array, and
the defect inspection method comprises a focus region adjustment process, adjusting one or more of a frequency, an amplitude, and a phase of an ultrasonic wave generated by each of the ultrasonic wave speakers or each of the ultrasonic wave vibrators, so that a focus region of the standing wave generated between the ultrasonic wave phased array and the reflexive surface is right above the inspection target.

15. The defect inspection method as claimed in claim 13, wherein the defect inspection device comprises a stage, and the bonded article is sucked and fixed to an upper surface of the stage,
wherein the ultrasonic wave phased array generates ultrasonic waves traveling in a direction along the upper surface of the stage, and
in the focus region adjustment process, one or more of a frequency, an amplitude, and a phase of an ultrasonic wave generated by each of the ultrasonic wave speakers or each of the ultrasonic wave vibrators are adjusted, so that the focus region of the standing wave is right above the bonding article.

16. The defect inspection method as claimed in claim 11, wherein the defect inspection device comprises a stage, and the bonded article is sucked and fixed to an upper surface of the stage,
the standing wave generator is formed by a surface of the bonded article sucked and fixed to the upper surface of the stage, and an ultrasonic wave phased array formed by a plurality of ultrasonic wave speakers or ultrasonic wave vibrators and disposed above the stage so as to face the upper surface of the stage, and
the defect inspection method comprises a focus region position adjustment process, adjusting one or more of a frequency, an amplitude, and a phase of an ultrasonic wave generated by each of the ultrasonic speakers or each of the ultrasonic vibrators, and
adjusting a position of a focus region of the standing wave generated between the ultrasonic phased array and the surface of the bonded article in a direction along the upper surface of the stage.

17. The defect inspection method as claimed in claim 11, wherein the inspection target is a semiconductor device formed by a substrate, a semiconductor element installed to the substrate, and a wire bonded to an electrode of the semiconductor element and an electrode of the substrate to connect each of the electrodes, and
the bonded article of the inspection target is the substrate and the semiconductor element installed to the substrate, and the bonding article of the inspection target is the wire.

* * * * *